(12) United States Patent
Lee et al.

(10) Patent No.: US 9,395,906 B2
(45) Date of Patent: Jul. 19, 2016

(54) GRAPHIC USER INTERFACE DEVICE AND METHOD OF DISPLAYING GRAPHIC OBJECTS

(75) Inventors: Seung Soo Lee, Seoul (KR); Ju Il Eom, Seoul (KR); Ki Won Yeom, Goyang-si (KR); Joong Ho Lee, Goyang-si (KR); Ji Hyung Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 481 days.

(21) Appl. No.: 12/188,237

(22) Filed: Aug. 8, 2008

(65) Prior Publication Data

US 2009/0040179 A1 Feb. 12, 2009

Related U.S. Application Data

(63) Continuation of application No. PCT/KR2006/005240, filed on Dec. 6, 2006.

(30) Foreign Application Priority Data

Feb. 10, 2006 (KR) .................. 10-2006-0013260
Apr. 24, 2006 (KR) .................. 10-2006-0036763

(51) Int. Cl.
*G06F 3/0488* (2013.01)
*G06F 3/0482* (2013.01)

(52) U.S. Cl.
CPC .......... *G06F 3/04883* (2013.01); *G06F 3/0482* (2013.01)

(58) Field of Classification Search
CPC .................. G06F 3/04883; G06F 3/0482
USPC ................... 345/156, 173; 715/799
See application file for complete search history.

(56) References Cited

U.S. PATENT DOCUMENTS

| | | | |
|---|---|---|---|
| 6,326,946 B1 * | 12/2001 | Moran et al. | 345/156 |
| 6,404,446 B1 * | 6/2002 | Bates et al. | 715/854 |
| 6,545,660 B1 * | 4/2003 | Shen et al. | 345/156 |
| 6,594,673 B1 * | 7/2003 | Smith et al. | |

(Continued)

FOREIGN PATENT DOCUMENTS

| | | |
|---|---|---|
| DE | 102 04 310 A1 | 8/2003 |
| JP | 11-085803 A | 3/1999 |

(Continued)

OTHER PUBLICATIONS

First page of Korean Patent No. 10-0758288 issued on Sep. 13, 2007, in counterpart Korean Application No. 10-2006-0036769 citing KR 10-2001-0040410 listed above in item 56 (1 page, in Korean, no English translation).

(Continued)

*Primary Examiner* — Amare Mengistu
*Assistant Examiner* — Sarvesh J Nadkarni

(57) ABSTRACT

A graphic user interface, an input/output computing apparatus for intuitive interfacing, and a method of interfacing are disclosed. The input/output computing apparatus for intuitive interfacing with a user, includes an input unit to detect one of a plurality of predetermined motions of the user and generate a signal corresponding to the detected predetermined motion, and a controller to carry out an operation corresponding to the signal and generate a control signal to display the result corresponding to the operation.

20 Claims, 24 Drawing Sheets

(56) References Cited

U.S. PATENT DOCUMENTS

| | | | |
|---|---|---|---|
| 6,791,530 B2* | 9/2004 | Vernier et al. | 345/156 |
| 6,931,604 B2* | 8/2005 | Lane | 715/853 |
| 6,985,898 B1* | 1/2006 | Ripley et al. | |
| 7,027,040 B2* | 4/2006 | Rekimoto et al. | 345/173 |
| 7,327,376 B2* | 2/2008 | Shen et al. | 345/676 |
| 2003/0006956 A1* | 1/2003 | Wu et al. | 345/156 |
| 2004/0046784 A1 | 3/2004 | Shen et al. | |
| 2005/0104885 A1* | 5/2005 | Jager et al. | 345/440 |
| 2005/0138160 A1* | 6/2005 | Klein et al. | 709/223 |
| 2005/0183035 A1* | 8/2005 | Ringel et al. | 715/811 |
| 2006/0001656 A1 | 1/2006 | LaViola, Jr. et al. | |
| 2006/0085767 A1* | 4/2006 | Hinckley | G06F 3/04883 715/863 |
| 2006/0122985 A1* | 6/2006 | Yamamoto et al. | 707/3 |
| 2006/0252531 A1* | 11/2006 | Kando et al. | 463/30 |
| 2008/0123586 A1* | 5/2008 | Manser | 370/328 |

FOREIGN PATENT DOCUMENTS

| | | |
|---|---|---|
| JP | 11-110119 A | 4/1999 |
| JP | 2002-123368 A | 4/2002 |
| JP | 2003-500771 A | 1/2003 |
| JP | 2003-178259 | 6/2003 |
| JP | 2004-110584 | 4/2004 |
| KR | 10-2001-0040410 A | 5/2001 |
| WO | WO 99/38149 | 7/1999 |
| WO | WO 00/72300 A1 | 11/2000 |
| WO | WO 01/75646 | 10/2001 |
| WO | WO 03/075172 | 9/2003 |
| WO | WO 2005/059674 | 6/2005 |

OTHER PUBLICATIONS

Extended European Search report issued on Nov. 12, 2009, in counterpart European Application No. 06823947.4 (6 pages).

Japanese Office Action issued Nov. 22, 2011, in counterpart Japanese Application No. 2008-554119 (3 pages, including English translation).

Sears, Andrew, Catherine Plaisant, and Ben Shneiderman. "A new era for touchscreeen applications: High precision, dragging icons, and refined feedback." Advances in Human-Computer Interaction 3 (1991).

* cited by examiner generate node generate link control button bundle delete electric signal with a message type

| operation | object | auxiliary information |

FIG. 13

| operation | object | auxiliary information | necessary condition | function |
|---|---|---|---|---|
| generate | node | | move in empty area | generate node |
| | link | center coordinates, radius | check start/end node ID | connect two nodes |
| | layer | | | generate layer |
| | control button bundle | | control button bundle OFF | control button bundle ON |
| | virtual keyboard | | virtual keyboard OFF | virtual keyboard ON |
| select | node | | check node ID | select node |
| | link | | check link ID | select link |
| | layer | | check layer ID | select layer |
| move | node | moved coordinates | attribute set mode OFF & select node | move node and child nodes |
| | node | moved coordinates | attribute set mode ON & select node | move node |
| modify Information | node | input via virtual keyboard | select node & virtual keyboard ON | modify node information |
| delete | node | | select node | delete node |
| | link | | select link | delete link |
| | layer | | select layer | delete layer |
| | control button bundle | | control button bundle ON | control button bundle OFF |
| | virtual keyboard | | virtual keyboard ON | virtual keyboard OFF |
| enlarge/reduce | node | | attribute set mode | expose/hide child nodes |
| adjust scale | node | | attribute set mode | scale up/down node |
| keyword search | node | | attribute set mode | search materials related to keyword |
| zoom in/out | layer | adjust scale | control button bundle ON | change display status of layer |
| open file | XML file | | select file in which graphic objects are saved | open file |
| save in file | XML file | | check path in which file is saved | save graphic objects in file |
| transfer file | XML file | address of client | check path in which file is transferred | transfer file to client |
| maximize | layer | layer ID | layer select & check whether layer is minimized | activate → deactivated layer |
| minimize | layer | layer ID | layer select & check whether layer is maximized | deactivated layer → activate |

FIG. 15

<node list>

| ID | description | coordinates | size | status |
|---|---|---|---|---|
| $410_1$ | keyword: hand based ···<br>upper: none<br>lower: $410_2$ ··· | (30, 30) | 1 | enlarge |
| $410_2$ | keyword: controller<br>upper: $410_1$<br>lower: ··· | (40, 15) | 0.5 | enlarge |

<link list>

| ID | description | start | end |
|---|---|---|---|
| $410_2$ | upper/lower | $410_1$ | $410_2$ |
| ⋮ | | | |

<layer list>

| ID | included node | Included link |
|---|---|---|
| $430_1$ | $410_1$, $410_2$ ··· | $420_4$ |
| $430_2$ | | | default size        scale up        scale down basic display in keyword search mode initial display screen            next display screen initial display screen → next display screen

GRAPHIC USER INTERFACE DEVICE AND METHOD OF DISPLAYING GRAPHIC OBJECTS

CROSS-REFERENCE TO RELATED APPLICATION

This application is a continuation application of a PCT/KR2006/005240 filed on Dec. 6, 2006 having an international publication number WO 2007/091772, and claims the benefit under 35 U.S.C. §119(a) of a Korean Patent Application Nos. 10-2006-0013260 filed on Feb. 10, 2006 and 10-2006-0036763 filed on Apr. 24, 2006, in the Korean Intellectual Property Office. The entire disclosures of the related applications including the Korean Patent Application Nos. 10-2006-0013260 and 10-2006-0036763, and the PCT/KR2006/005240 and its corresponding international publication WO 2007/091772, in English, are incorporated herein by reference.

TECHNICAL FIELD

The following description relates to graphic user interfaces, and more particularly, to a graphic user interface for receiving a user input to generate a graphic object and for displaying the generated graphic object.

BACKGROUND

Computers are becoming necessary tools for conducting meetings at conference rooms. That is, relevant meeting materials are now provided as computer-readable files. As such, file management programs (e.g., Windows Explorer™) are often used to search and display such materials However, it may be difficult to simultaneously display a large amount of materials and their relations in the conventional explorer or programs. Further, it is also difficult for users to understand them intuitively since the folders and the files are typically provided in a hierarchical manner. Also, in order to display a material relating to the meeting at hand, the users may be required to navigate a folder where the corresponding material is located.

A meeting procedure support system for visualizing relevant materials has been developed and used in order to accommodate various items from a plurality of users. However, when a new item is introduced in such a system, many materials need to be displayed together in real time to facilitate the attendees understanding since the new item may be relevant to such materials. In other words, it is desirable to display the current item, related materials and their relations in a timely manner such that the attendees can easily understand them at once without resorting to any complicated exploring procedures.

Further, the related materials may include various types of materials such as an image file, a video file, a sound file, a table file, text file, etc. Thus, there is a need to save and display such materials, as well as to structure the meeting at hand in view of such materials and their relationships to each other.

A display method is also needed for enabling the attendees sitting around a meeting table to conveniently understand the contents of the meeting procedure, especially the read text information.

There is a need for a system adapted to provide functions necessary for meeting procedures, which can intuitively and comprehensively display the status of the meeting and operate the display elements by using an intuitive interface requiring only minimized operations (not complicated interface).

SUMMARY

Accordingly, according to an aspect, there is provided a graphic user interface useful for a meeting procedure. To do this, information needed for the meeting procedure may be saved in a graphic object and displayed in a display unit. For example, a node, a meaning aggregate, having stored the information may be displayed in the display unit, and may be connected to another node by a link based on the relationship between their information. Further, a layer may be formed, which includes at least one node and a link(s) connected to the node. A graphic user interface displaying a structure including such a node, a link or a layer is provided to facilitate and assist the meeting procedure.

According to another aspect, there is provided a graphic user interface which allows arrangement and display of a plurality of information needed for a meeting procedure. The reference materials may be accessible easily and quickly when preparing for the meeting. Further, the users may intuitively understand the status of the past and present meetings since the distribution of the nodes and the links are visualized.

According to still another aspect, an input/output computing apparatus for intuitive interfacing with a user, comprises an input unit to detect one of a plurality of predetermined motions of the user and generate a signal corresponding to the detected predetermined motion, and a controller to carry out an operation corresponding to the signal and generate a control signal to display the result corresponding to the operation.

The apparatus may further comprise a display unit to display the result corresponding to the operation.

The display unit may display nodes corresponding to and providing information on materials stored in a database accessible by the apparatus and a link between the nodes.

The materials may be related materials having one of a parent/child relationship, a prior/posterior relationship, and a belonging relationship.

The input unit may comprise a touch screen to sense predetermined motions of a plurality of users and allow the plurality of users to simultaneously input with respect to the apparatus.

The detected predetermined motion may be one of intuitive gestures including a motion to generate a graphic object corresponding to a material stored in a database accessible by the apparatus, a motion to generate a link between graphic objects, a motion to generate a control button, a motion to generate a virtual keyboard, a motion to delete an object, and a motion to generate a layer or a second layer to arrange one or more graphic objects corresponding to a material or related materials stored in the database.

The apparatus may further comprise a memory accessibly by the controller to store a mapping table to interpret the signal into a corresponding operation, and to store a data structure for graphic objects managed by the controller.

The graphic object may be acted on to one of input information with respect to the corresponding material, search the database for related materials to display the related materials, change location and/or direction of the graphic object, enlarge/reduce the graphic object, and open the corresponding material.

The apparatus may further comprise a transmitter and/or receiver unit to communicate information on the graphic object to at least one computing client apparatus.

The information on the graphic object may be transmitted/received via an XML based socket data communication.

According to still another aspect, an input/output computing apparatus for intuitive interfacing with a user, comprises an input unit to receive an input from the user and generate a signal corresponding to the input, a display unit to display graphic objects corresponding to and providing information on materials stored in a database accessible by the apparatus and a link between the graphic objects to represent a relationship of the graphic objects, and a controller to carry out an operation corresponding to the signal and control the display unit.

The graphic objects and the link may be displayed to allow the user to intuitively visualize the relationship of the corresponding materials and/or status of the corresponding materials.

A graphic object may be acted on to one of input information with respect to a corresponding material, search the database for related materials to display the related materials, change location and/or direction of the graphic object, enlarge/reduce the graphic object, and open the corresponding material.

The input unit may be one of a touch screen, an infrared ray transceiver, and a camera for sensing a visual input, so as to allow the user to interface with the graphic object acted on.

The input unit may detect one of a plurality of predetermined motions of the user and generate a signal corresponding to the detected predetermined motion, and the controller may carry out an operation corresponding to the signal and generates a control signal for the display unit to display the result corresponding to the operation.

The detected predetermined motion may be one of intuitive gestures including a motion to generate a graphic object corresponding to a material stored in a database accessible by the apparatus, a motion to generate a link between graphic objects, a motion to generate a control button, a motion to generate a virtual keyboard, a motion to delete an object, and a motion to generate a layer or a second layer to arrange one or more graphic objects corresponding to a material or related materials stored in the database.

According to still another aspect, a method of interfacing with an input/output computing apparatus, comprises detecting one of a plurality of intuitive motions of a user, generating a signal corresponding to the detected intuitive motion, performing an operation corresponding to the signal, and displaying the result of the operation.

The operation may be one of an operation to generate a graphic object corresponding to a material stored in a database accessible by the apparatus, an operation to generate a link between graphic objects, an operation to generate a control button, an operation to generate a virtual keyboard, an operation to delete an object, and an operation to generate a layer or a second layer to arrange one or more graphic objects corresponding to a material or related materials stored in the database.

The method may further comprise detecting an action with respect to the graphic object to one of receive input information with respect to the corresponding material, search the database for related materials to display the related materials, change location and/or direction of the graphic object, enlarge/reduce the graphic object, and open the corresponding material.

The method may further comprise displaying graphic objects corresponding to and having information on materials stored in a database accessible by the apparatus and a link between the graphic objects to represent a relationship of the graphic objects, wherein the graphic objects and the link are displayed to allow a user to intuitively visualize the relationship of the corresponding materials and/or status of the corresponding materials.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 13 is a diagram illustrating a mapping table mapping an electric signal with executed operation in accordance with an exemplary embodiment.

FIG. 15 and FIG. 16 are diagrams illustrating data structures for a graphic object managed by a controller in accordance with exemplary embodiments.

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

In accordance with an aspect, a graphic user interface comprises a first area to receive user input to generate a graphic object therein, an input converter to convert the user input into electric signal to transmit to a processor, a control signal receiver to receive a display control signal from the processor, and a second area to display the graphic object therein based on the control signal, wherein the graphic object includes a node representing a minimum unit of information and a link connecting nodes representing a relationship of the connected nodes.

In accordance with another aspect, a method of displaying a graphic object using a graphic user interface comprises determining whether user input exists or not, determining whether the user input is located in a first area or in a second area, if the user input is located in the first area and corresponds to node generation, displaying a node, if the user input starts in the first area and passes through at least two nodes, displaying a link connecting the nodes passed through, and if the user input is located in the second area, activating a corresponding graphic object.

Basic concepts and related terms used herein are explained below.

Figure 1:
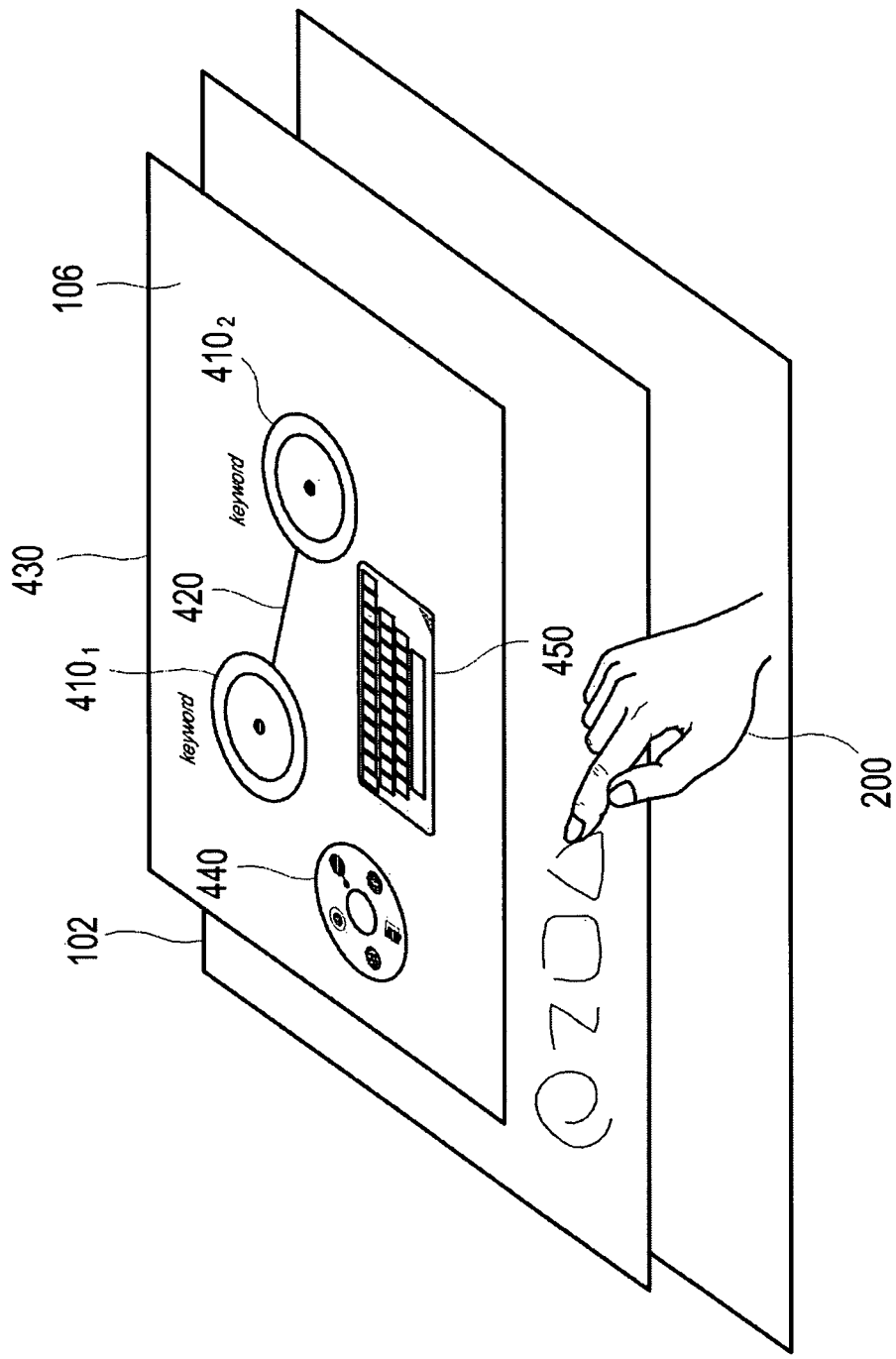
FIG. 1 is a diagram illustrating a graphic object inputted and displayed based on a manual operation in accordance with an exemplary embodiment.

The term "graphic object" may refer to a graphic figure displayed in a display unit. The term may also refer to an object representing information. As shown in FIG. 1 exemplifying graphic objects, the graphic object may include a circle $410_1$, $410_2$, a line 420, a rectangle 430, etc. They may correspond to an information object, i.e., a node, a link, and a layer, respectively. For example, "the node $410_1$, $410_2$" is an information object representing a minimum unit of information. The node $410_1$, $410_2$, when applied to a meeting, may represent a keyword for an item to be discussed or a derived keyword associated with the keyword.

Figure 2:
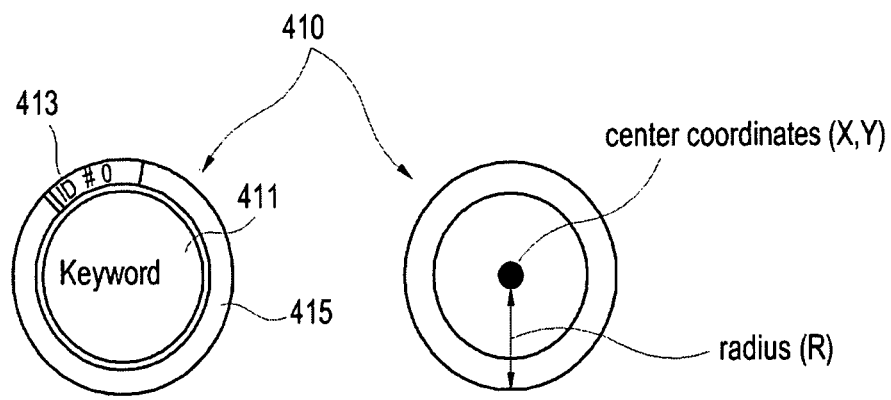
FIG. 2 through FIG. 6 are diagrams illustrating graphic objects in accordance with exemplary embodiments.

FIG. 2 illustrates an exemplary node displayed in a display unit. The node 410 may include a keyword area 411, wherein the keyword may imply an opinion or a material. The keyword of the node $410_1$ may be "a manual operation based input-output apparatus" and the keyword of the node $410_2$ may be "a controller," which is a lower part of the node $410_1$, when the example above in connection with FIG. 1 is applied to a meeting for implementing an exemplary embodiment. In another example, the keyword of the node $410_1$ may be "a manual operation based input-output apparatus" and the keyword of the node $410_2$ may be "A," who is in charge of implementing the node $410_1$. The shape of the node is not limited to a circle (as shown in FIG. 1 and FIG. 2) and may be a triangle or other shapes.

As shown in FIG. 2, the node 410 may further include an ID area 413 representing the position of the node 410. Further, the node 410 may also include a color area 415 representing the status of the node 410 such that a user may easily distinguish the status of the node 410 when displayed. The status of the node may include, for example, whether the node is selected or not. The node may further include auxiliary information such as center coordinates (x, y) and a radius r as a node size.

"The link 420" may be an information object connecting the nodes and representing the relationship between the connected nodes. The relationship between the nodes, which is represented by "the ink 420," may include, for example, upper/lower, prior/posterior or belonging relations, etc. Further to the above example, wherein the node $410_1$ is "a manual operation based input-output apparatus" and the node $410_2$ is "a controller," the link 420 may represent the upper/lower relation between the two devices. As another example, if the node $410_1$ is "a manual operation based input-output apparatus" and the node $410_2$ is "A," the link 420 may represent the belonging relation, that is, who is in charge of the device.

Figure 3:
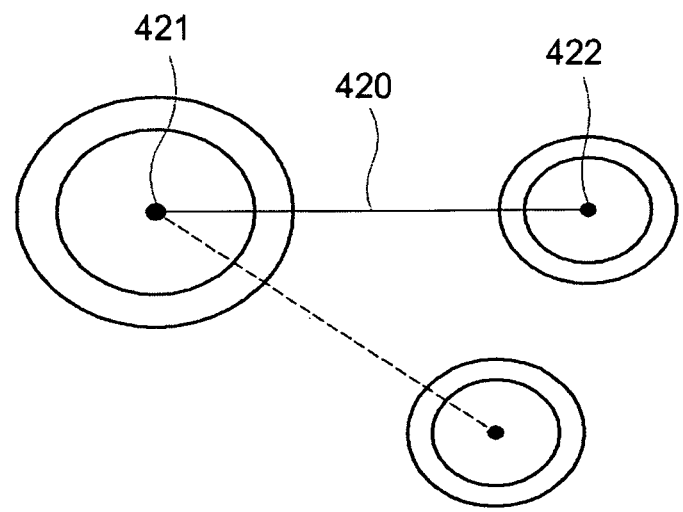

FIG. 3 illustrates an exemplary link displayed in a display unit. As shown in FIG. 3, the link 420 may connect two nodes having a parent/child relationship. Further, the parent/child relationship may represent the upper/lower, prior/posterior or belonging relations, etc., as described above. The link 420 may start at the center coordinates 421 of the parent node and end at the center coordinates 422 of the child node. The link 420 may be depicted as a solid line or a dotted line depending on the relationship between the two connected nodes. Further, the solid line or dotted line is only an example of shapes depicting a link to distinguish the relations represented by the link. Also, the color or thickness may be used in other embodiments.

"The layer 430" may be an information object including at least one node and a link connected to the node. It represents an inclusive attribute of the graphic objects included therein. For example, if the layer 430 represents a meeting as shown in FIG. 1, the nodes $410_1$, $410_2$ and the link 420 may have a characteristic representing a related item discussed in the meeting. It should be noted that a rectangle is only an example of shapes depicting a layer in FIG. 1 and is certainly not limited thereto. Further, although two nodes $410_1$, $410_2$, one link 420 and one layer 430 are shown in FIG. 1, it is not limited thereto. That is, other embodiments may include additional nodes, links, layers or other graphic objects, as well as less nodes, links, layers or graphic objects.

Figure 4:
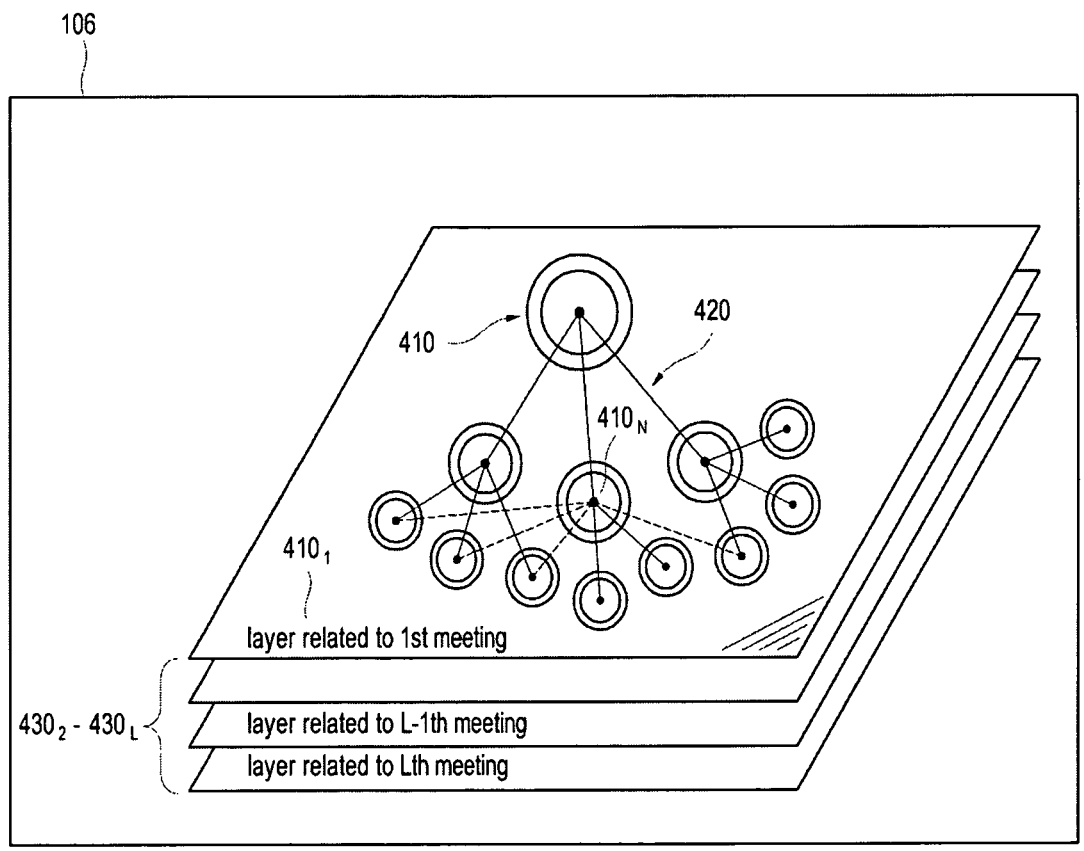

FIG. 4 illustrates an exemplary graphic object including a plurality of layers. Further to the example of the meeting above, the plurality of layers $430_1$-$430_L$ may represent an nth meeting result, respectively, and may be managed in a collective manner. In this case, the latest progress of the meetings may be intuitively understood by glancing at several layers.

Further, for example, a layer for determining whether it is for or against a project, a layer for brainstorming, a layer for structuring attending parts, a layer for scheduling, etc. may be collectively managed. As such, if a plurality of layers is managed in a collectively manner, then the entire project would be intuitively understood by glancing at the several layers. Further, an order of the layers or a bundling style of the layers may be changed to help the users to easily understand the progress of the meetings depending on the circumstances.

Also, the number of links or the connection configuration of links may help the users to understand the current state of the meetings. For example, a node $410_N$ is optimally connected to many links and the connection configuration has a layout of tree structure as shown in FIG. 4. This may mean that many items are derived from the item represented by the node $410_N$ and those items are in active discussions. If the dotted line means, for example, a pending state, then a large part of the items related to the node $410_N$ may not be completed and a plurality of schemes for completing them may be specifically discussed. As such, the users may easily understand the progress of the meetings by looking at the display.

Figure 5:
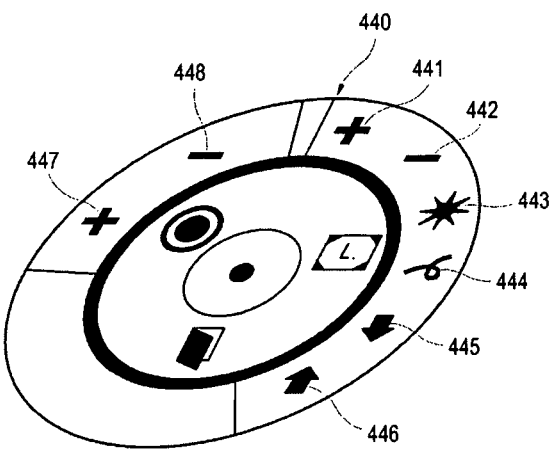

The graphic object may further include a tool object to perform operations and input information on another graphic object (e.g., a control button bundle 440, a virtual keyboard 450, etc.), as shown in FIG. 1. Specifically, "the control button bundle 440" may be a tool object for facilitating the users to operate the graphic objects by an intuitive manual operation. FIG. 5 illustrates an exemplary control button bundle 440.

The circle is an example of the shapes depicting the control button bundle 440 in FIG. 1 and FIG. 5.

As shown in FIG. 5, the control button bundle 440 may include symbols representing "layer zoom in 441," "layer zoom out 442," "layer generate 443," "layer delete 444," "save in file graphic object 445," "open graphic object file 446," "adjust node structure scale 447 and 448," etc.

The term, "node structure" may refer to a currently selected node, all links connected to the selected node and all nodes connected to the links. The term "adjust node structure scale" may refer to, for example, "enlarge/reduce node structure" having a reference position with the selected node. Alternatively, it may refer to "enlarge/reduce node structure" having a reference position with a predetermined display position. The control button bundle 440 may also include "node structure position adjust." The term "node structure position adjust" may refer to "move node structure" having a reference position with the selected node or with a predetermined display position, similar to the "adjust node structure scale." The above control operations are further described below.

The users may perform a corresponding operation on a corresponding graphic object with an intuitive manual operation, for example, by touching a symbol in the control button bundle 440, corresponding to a desired operation with his/her finger. Functions and symbols of the control button bundle are only examples and should not be limited thereto.

"The virtual keyboard 450" may be a tool object, which enables text input. For example, the users may input/modify a keyword of the node $410_1$ or $410_2$, the name of the layer 430 or other auxiliary information of a graphic object by using the virtual keyboard 450.

Figure 6:
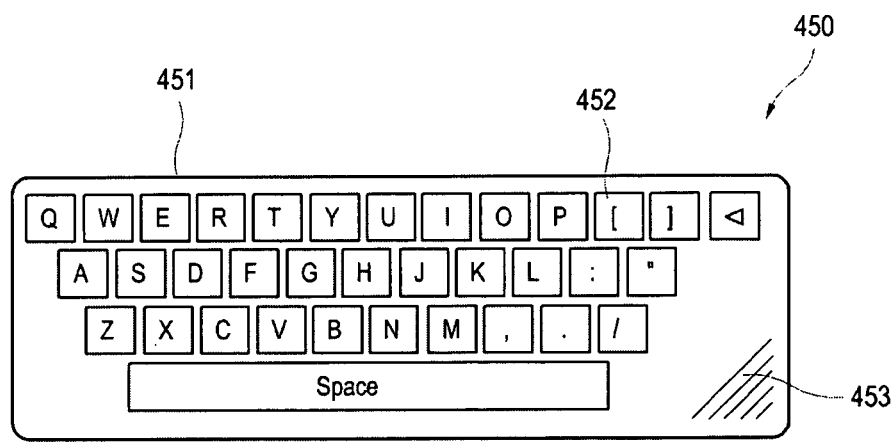

FIG. 6 illustrates an exemplary virtual keyboard 450. The virtual keyboard 450 may include a virtual keyboard area 451, a key button area 452 in which key buttons are arranged, e.g., in similar way to "Hanguel keyboard" compatible with PC/AT 101 key, and a select area 453 adjusting the size of the virtual keyboard 450. The users may input a text with an intuitive hand operation, for example, by touching the corresponding key button area 452 in the virtual keyboard 450 with his/her finger. The virtual keyboard 450 shown in FIG. 6 is only an example of virtual keyboards and is certainly not limited thereto.

Based on the graphic objects described above, exemplary embodiments are explained below with reference to FIG. 7 through FIG. 30.

Figure 7:
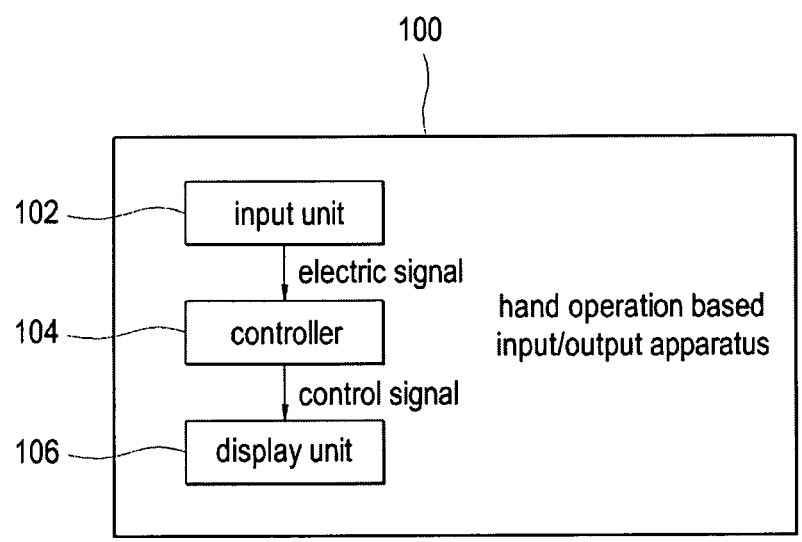
FIG. 7 is a block diagram illustrating a manual operation input/output apparatus in accordance with an exemplary embodiment.

FIG. 7 illustrates a block diagram of a manual operation based input/output apparatus constructed in accordance with an exemplary embodiment. The manual operation based input/output apparatus 100 may include an input unit 102, a controller 104 and a display unit 106.

The input unit 102 may sense a user's manual operation and convert it to an electric signal. Sensing the manual operation may include sensing a tactile input such as a touch screen, sensing a visible input such as a camera or sensing the infrared rays such as an infrared ray transceiver. However, it is certainly not limited to the above. The input unit 102 may process the sensed position data, e.g., calculate an initial position and a moving course of a hand to generate an electric signal representing the meaning of the sensed hand operation.

Figure 8:
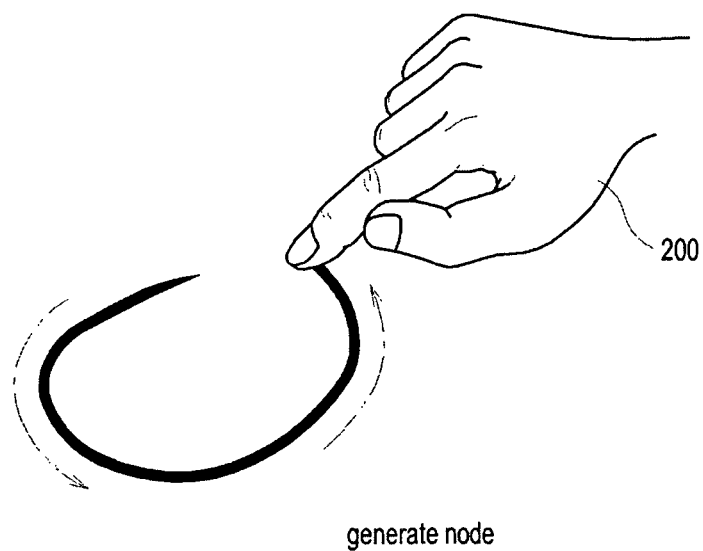
FIG. 8 through FIG. 11 are diagrams illustrating manual operation based inputs in accordance with exemplary embodiments.

FIG. 8 through FIG. 11 illustrate examples of a user's manual operation. As shown in FIG. 8, when a user draws a circle with his/her finger 200 in the input unit 102, the input unit 102 may sense the circle and generate an electric signal representing the meaning of the circle, e.g., an electric signal representing a "generate node."

Figure 9:
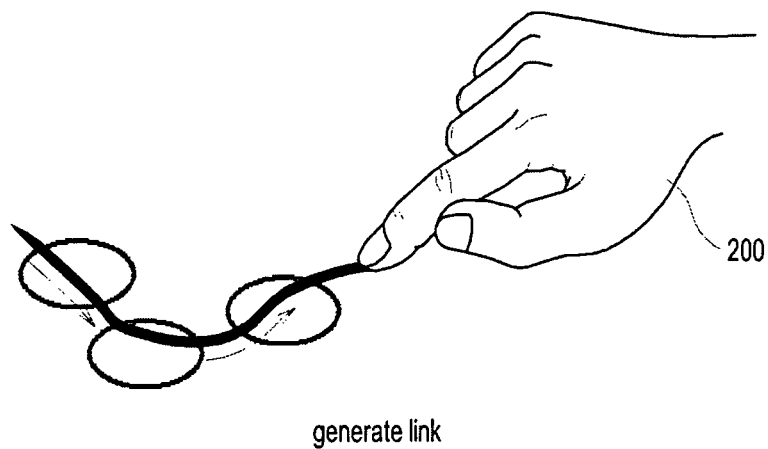

As shown in FIG. 9, when a user draws a line with his/her finger 200 in the input unit 102, the input unit 102 may sense the line and generate an electric signal representing the meaning of the line, e.g., an electric signal representing a "generate link." In the embodiment, when the finger 200 starts at, for example, an area in the display unit 106 having no graphic objects, drags through at least two nodes, and removes itself from the display unit 106, the input unit 102 may sense this and generate the electric signal of "generate link." Further, the first node touched with the finger 200 may be the most upper parent node and the next node may be the child of the first node in the drag locus. If the finger 200 drags through more than three nodes, then a node in the drag locus may be a childe node of the immediately previous node.

Figure 10:
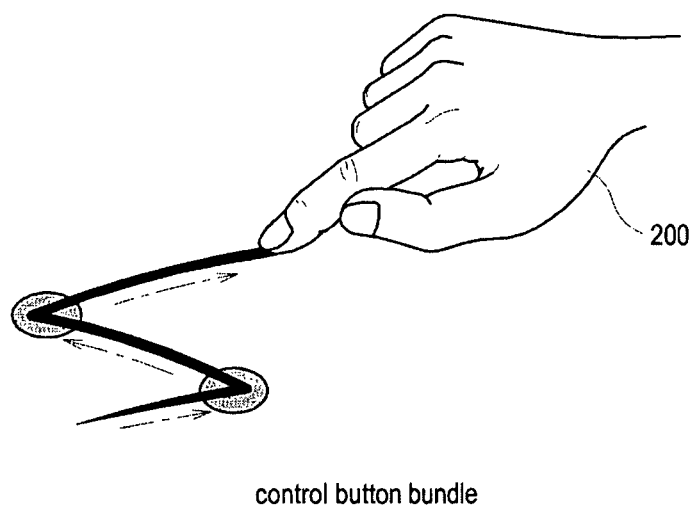

As shown in FIG. 10, when a user draws a z shape with his/her finger 200 in the input unit 102, the input unit 102 may sense the z shape and generate an electric signal representing the meaning of the z shape, e.g., an electric signal representing a "control button bundle 440" generate (activate). Similarly, when a user draws a rectangle with his/her finger 200 in the input unit 102, the input unit 102 may sense the rectangle and generate an electric signal representing the meaning of the rectangle, e.g., an electric signal representing "virtual keyboard 450 generate (activate)."

If a user touches a certain point in the input unit 102 with his/her finger 200 (pointing event), then the input unit 102 may sense the pointing event and generate an electric signal representing the meaning of the pointing event, e.g., an electric signal representing a "corresponding graphic object (node, link or layer) select." If the pointing event is on the symbol of a graphic object, e.g., "save in file 445" of control button bundle 440, then the input unit 102 may sense this and generate an electric signal representing "save in file." Similarly, if the pointing event is on a text key button of virtual keyboard 450, then the input unit 102 may sense this and generate an electric signal representing a "corresponding text input."

Figures 11, 12:
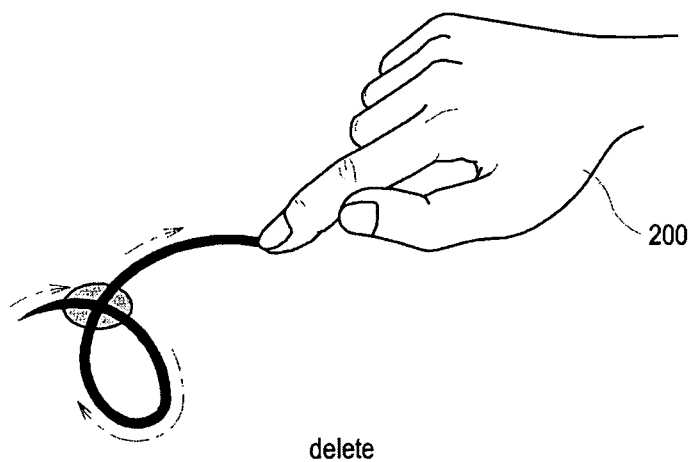
FIG. 12 is a diagram illustrating an electric signal having a form of a message type in accordance with an exemplary embodiment.

As shown in FIG. 11, when a user draws a spring shape with his/her finger 200 in the input unit 102, the input unit 102 may sense the spring shape and generate an electric signal representing the meaning of the spring shape, e.g., an electric signal representing a "delete selected graphic object."

When a user drags his/her finger 200 after selection, the input unit 102 may sense this and generate an electric signal representing the meaning of the drag, e.g., an electric signal representing a "move selected graphic object."

The circle, line, pointing event, spring shape, etc. are examples of intuitive gestures. However, such gestures are certainly not limited to the above. In the embodiment, the electric signal generated in the input unit 102 may have a protocol such as a message shown in FIG. 12. In other words, the electric signal may have an operation field, an object field representing a target on which the operation is to be performed, and an auxiliary information field.

Figure 14:
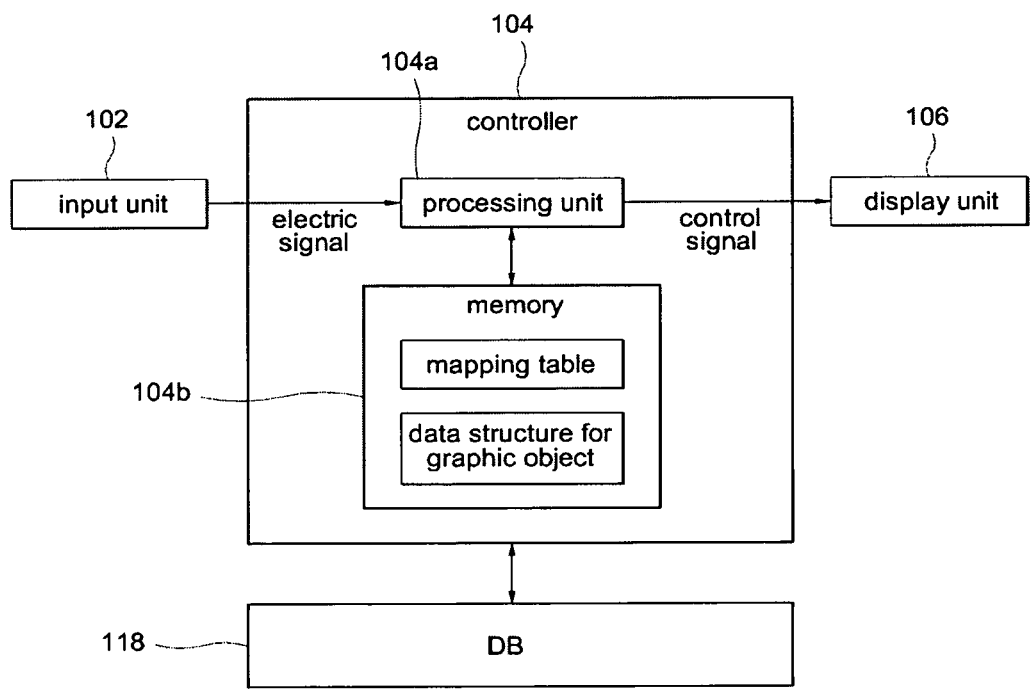
FIG. 14 is a block diagram illustrating an input/output apparatus having a controller in accordance with an exemplary embodiment.

FIG. 14 illustrates a detailed configuration for an exemplary controller 104 of a manual operation based input/output apparatus in accordance with an exemplary embodiment. The controller 104 may include a processing unit 104a. The processing unit 104a may receive an electric signal (or a message) from an input unit 102, interpret the received signal and perform an operation based on the interpretation. If the electric signal is interpreted as a message for display in a display unit 106, then the processing unit 104a may transmit an execution control signal instructing this to the display unit 106. For example, if the electric signal is interpreted as a message having an operation of "generate" and an object of "node," then the processing unit 104a may generate an information object, "node," and transmit to the display unit 106 an execution control signal instructing to display the generated node. The controller 104 including such a processing unit 104a may be implemented with an apparatus available for operation and control processing such as a microprocessor, although not limited thereto.

According to an aspect, the controller 104 may further include a storage device such as a memory 104b, which is accessible to the processing unit 104a.

The memory 104b may have stored a mapping table, as shown in FIG. 13. In this case, the controller 104 may compare the received electric signal with the mapping table saved in the memory 104b to interpret the operation and the target represented by the electric signal.

Figure 16:
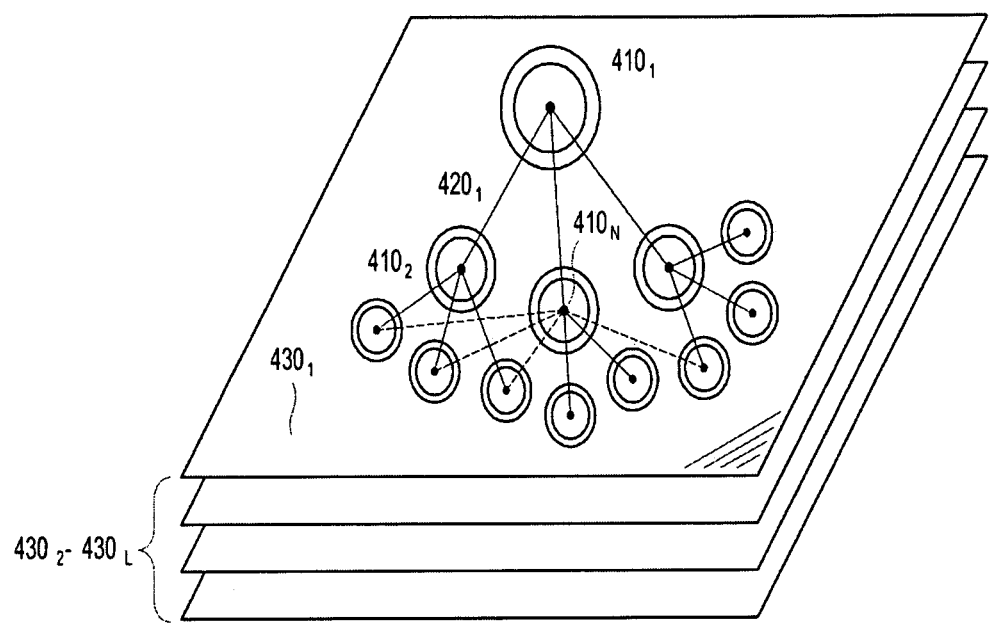

The memory 104b may also have a data structure for the graphic objects managed by the controller 104. FIG. 15 and FIG. 16 illustrate exemplary data structures managed by a controller. As shown in FIG. 15 and FIG. 16, while not limited thereto, there may be two types of data structure, i.e., one is a list and the other is a graph.

As shown in FIG. 15, the list, which is a linear data structure, may enable easy generation, deletion and search of each graphic object. The node list may include a node identification (ID) field, a description field, a coordinates field, a radius size field and a status field, as shown in FIG. 15. The description field may include a keyword implying a material represented by the corresponding node, an upper node ID and/or a lower node ID of the corresponding node, etc. The coordinates field may include coordinates, in which the center of the corresponding node is located. The radius size field may include, for example, a radius value in a pixel unit. The status field may include the status of "enlarge/reduce," which is explained below in more detail. The fields and their contents of the node list above are only an example, and are certainly not limited thereto.

As shown in FIG. 15, the link list may include a link ID field, a description field, a start field and an end field. The description filed may include a relationship between the two nodes connected by the corresponding node. The start and end fields may include the IDs of the start node and the end node, respectively. The fields and their contents of the link list above are only an example, and are certainly not limited thereto.

As shown in FIG. 15, the layer list may include a layer ID field, an included node field and an included link field. The included node and link fields may include the IDs of the nodes and the links included in the corresponding layer, respectively. The fields and their contents of the layer list above are only an example, and are certainly not limited thereto.

When a plurality of users use a system in accordance with an exemplary embodiment, a variety of dynamic operations such as "generate, "delete," etc. may be performed on the graphic objects. In such a case, the system may provide an efficient management of the memory space since the graphic objects are managed as a list, which enables dynamic generation of necessary memory space and connection of the graphic objects without making the memory space in advance for the system design.

As shown in FIG. 16, the graph, which is a non linear data structure, may represent the relationship between the nodes and the links connected thereto, as well as logical structural information. As shown in FIG. 16, the graph may represent prior/posterior, upper/lower or belonging relations between the nodes. The graph may be operated and managed in a similar way to the display unit 106. As shown in FIG. 16, the graph, which is used as a non linear data structure, may represent all the semantically connected structures having no directional characteristics. This is different from a tree structure. Therefore, in a manual operation based input/output apparatus according to an exemplary embodiment, the graphic object control such as generation, deletion, etc. may be performed and represented intuitively according to the user's view since the graphic objects are managed as a graph.

With reference to FIG. 13, exemplary operations performed by the controller 104 are explained below.

If the controller 104 interprets the operation of the electric signal as "generate," then the controller 104 may generate a graphic object such as a node, a link, a layer, etc., register the generated graphic object at the data structure such as a list or graph saved in the memory 104b, and transmit to the display unit 106 a control signal instructing to display the generated graphic object. If the target of the electric signal is interpreted as "control button bundle," or "virtual keyboard," then the controller 104 may set the status of the control button bundle or the virtual keyboard to be "ON" (activated and displayed in the screen) and transmit to the display unit 106 a control signal instructing to display the activated control button bundle or the virtual keyboard.

First, the controller 104 may check whether the graphic object such as a node, a link, a layer, etc. to be generated has been already saved or not. For example, if the keyword of the node to be generated is identical to that of a node in the node list, then it may be determined that the corresponding node has already existed. Further, if the start node ID and the end node ID of the link to be generated are identical to those of a link in the link list, then it may be determined that the corresponding link has already existed.

If the corresponding graphic object does not exist, then the ID of the graphic object may be saved in the corresponding list as basic information (see FIG. 15). In the case of generating a node, the center coordinates and the size (radius) value of the node may be additionally saved in the node list. In the case of generating a link, the IDs of the start node and the end node may be additionally saved in the link list, wherein the two nodes should be in the node list. As such, the registered graphic object may be saved in the graph to represent the position of the corresponding graphic object and the relationship with other graphic objects in the graph (see FIG. 16).

If the controller 104 interprets the operation of the electric signal as "select," then the controller 104 may detect the ID of the selected graphic object. In other words, "select" may be used as preprocess to "move," "modify information," "maximize/minimize layer," etc. For example, a manual operation for "select" may include a pointing event such as finger touch. If such a pointing event occurs, then the controller 104 may communicate with the display unit 106 in order to identify the ID of the pointed graphic object.

If the controller 104 interprets the operation of the electric signal as "move," then the controller 104 may move the (selected) node, save the moved coordinates of the node in the data structure such as the node list or graph, and transmit to the display unit 106 a control signal instructing to display the node at the moved coordinates.

According to an aspect, "move" may include "move a single node" and "move all child nodes." For example, if a node is "selected" when the "attribute set mode" of the node is ON, then "move a single node" may be performed. In this case, the ID of the node may be detected by "select" and the moved coordinates may be calculated to move the selected node.

If a node is "selected" and "moved" when the "attribute set mode" of the node is OFF (displayed in a deactivated form, e.g., in translucent form), then the other graphic objects connected to the selected node (e.g., links connected to the selected node and nodes connected to the links) may be moved together. In such a case, the IDs of the selected node and other nodes connected thereto may be extracted. Then, the moved coordinates may be calculated and saved in the corresponding data structure.

If the controller 104 interprets the operation of the electric signal as "modify information," then the user may need to use the virtual keyboard 450 to input. Further, the graphic object such as a node, a link or a layer should be "selected" in advance. The user may select such a graphic object and input information by using the virtual keyboard 450 to modify the information of the corresponding graphic object. The modified information may be saved in the corresponding data structure.

If the controller 104 interprets the operation of the electric signal as "delete," then the controller 104 may delete the information for the "selected" graphic object in the corresponding data structure and transmit to the display unit 106 a control signal instructing to display this (to delete the graphic object). In other words, the operation may be opposite to the "generate" operation. If the target of the electric signal is interpreted as "control button bundle" or "virtual keyboard," then the controller 104 may set the status of the control button bundle or the virtual keyboard to be "OFF" (displayed in deactivated form, e.g., in translucent form) and transmit to the display unit 106 a control signal instructing to display the deactivated control button bundle or the virtual keyboard.

If the controller 104 interprets the operation of the electric signal as "enlarge/reduce," then the controller 104 may change the status field for the child nodes of the corresponding node in the data structure to expose or hide the child nodes and transmit to the display unit 106 a control signal instructing to display this.

Figure 17:
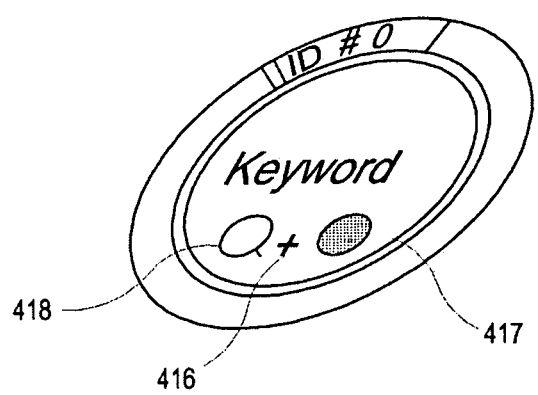
FIG. 17 through FIG. 20 are diagrams illustrating functions of an attribute set mode in accordance with exemplary embodiments.

As shown in FIG. 17, the operation of "enlarge/reduce" may be one of the operations related to "attribute set mode" of the node. If a node is in "attribute set mode," then the attributes of the node may be set. For example, when a node is double-clicked, the mode of the node may be turned to "attribute set mode." When the node is double-clicked once again in the "attribute set mode," the mode of the node may be returned to the "basic mode." Such mode conversion is only an example and the present invention is certainly not limited thereto.

Figure 18:
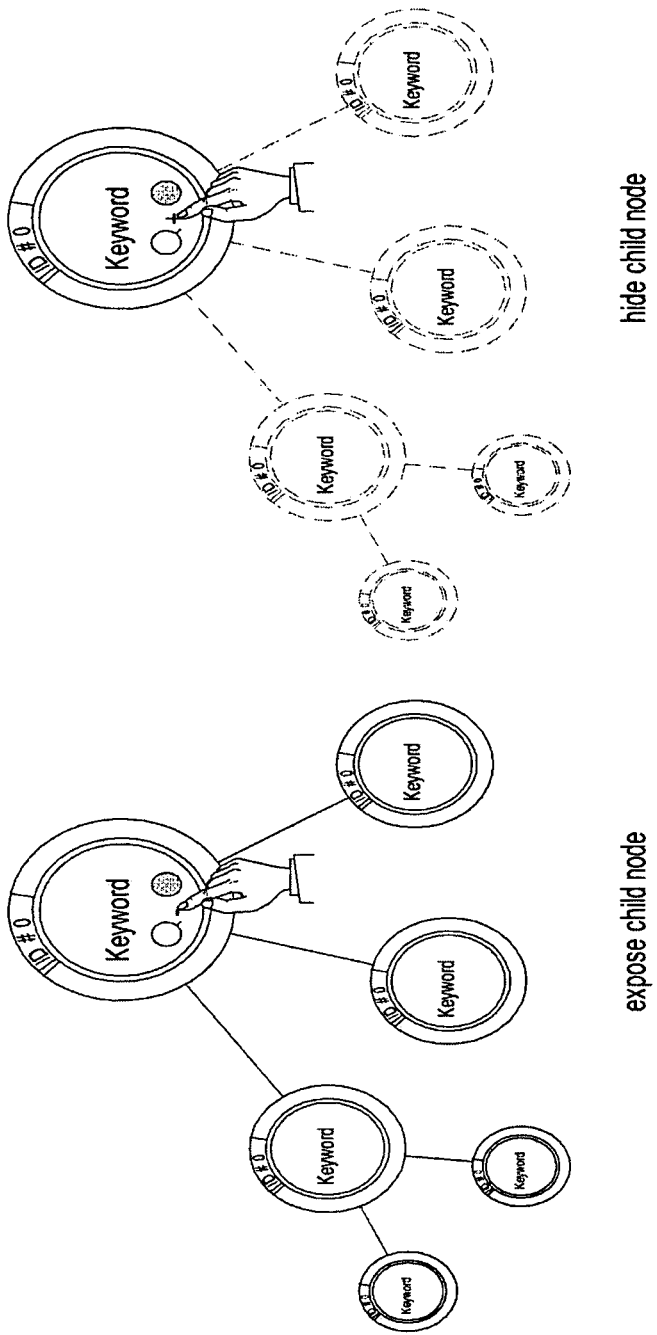
Figure 19:
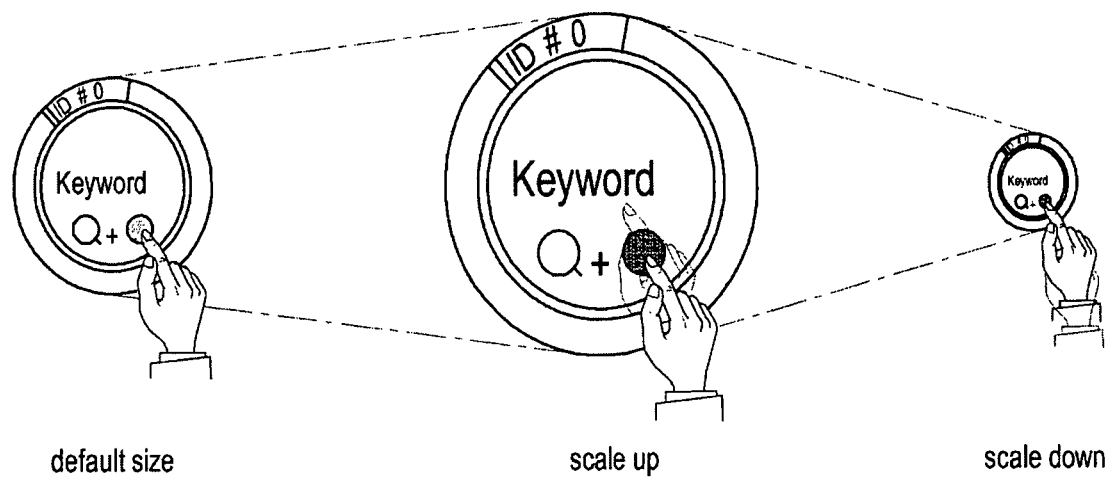
Figure 20:
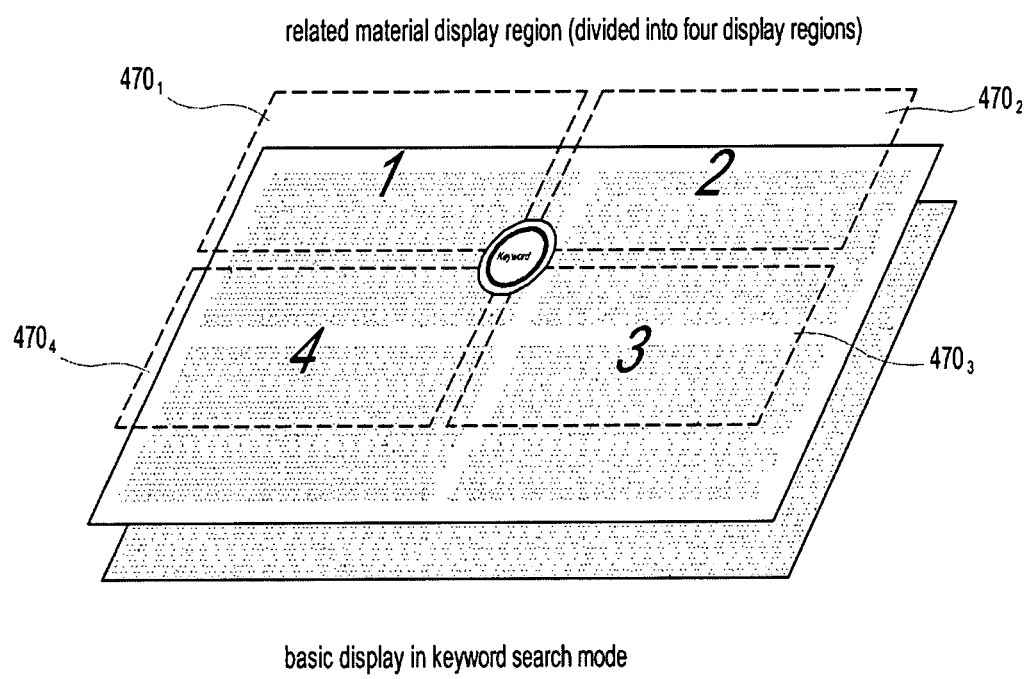

FIG. 18 through FIG. 20 illustrate "enlarge/reduce," "adjust scale" and "keyword search," respectively, as exemplary operations in the attribute set mode.

As shown in FIG. 18, "enlarge/reduce" may be executed if, e.g., +/− symbol 416 of a node $410_1$, is touched by a finger (pointing event) in the attribute set mode. If the controller 104 interprets the operation of the electric signal as "enlarge/reduce," then the controller 104 may first check the current status of the corresponding node, e.g., whether the node is in enlarged status or in reduced status. As shown at the left side of FIG. 18, if the node $410_1$ is in the enlarged status, then the controller 104 may extract the IDs of the child nodes, e.g., $410_2$-$410_6$, and the links, e.g., $420_1$-$420_5$, from the data structure for the node $410_1$. Then, the controller 104 may change the information on the extracted child nodes $410_2$-$410_6$ and links $420_1$-$420_5$ to be in the reduced status, and change their colors in the display unit 106, e.g., in translucent form. On the contrary, if the node $410_1$ is in the reduced status as shown at the right side of FIG. 18, then the controller 104 may return the information on the extracted child nodes $410_2$-$410_6$ and links $420_1$-$420_5$ to the enlarged status, and change their colors in the display unit, e.g., in clear form. The changed information in the "enlarge/reduce" operation may be saved and managed in the corresponding data structure.

As shown in FIG. 19, the "adjust scale" may be executed if, e.g., adjust scale area 417 of a node $410_1$ is touched by a finger (pointing event) and dragged properly in the attribute set mode. If the controller 104 interprets the operation of the electric signal as "adjust scale," then the controller 104 may calculate a distance from the center coordinates of the node when the pointing event has occurred to the current finger's position and adjust the size of the node in proportion to the calculated distance.

Assume that the size of the node is a reference size as shown at the left side of FIG. 19. If the user drags his/her finger, e.g., outside of the node after he/she touched the adjust scale area 417 with his/her finger, then the size of the node may be scaled up as shown at the middle side of FIG. 19. On the contrary, if the user drags his/her finger, e.g., inside of the node, then the size of the node may be scaled down as shown at the right side of FIG. 19.

The controller unit 104 may save the changed size of the node in the data structure of the corresponding node, e.g., the size field of the node list, and transmit to the display unit 106 a control signal instructing to display this.

The "keyword search" may be executed if, e.g., the keyword search area 418 of a node is touched by a user's finger (pointing event) in the attribute set mode. If the controller 104 interprets the operation of the electric signal as "keyword search," then the controller 104 may search the database (DB) 118 (see FIG. 14), call the files related to the keyword of the node, parse the files and transmit to the display unit 106 a control signal instructing to display the parse files.

FIG. 20 illustrates an exemplary display in a display unit on executing the keyword search. As shown in FIG. 20, the display area of the display unit 106 may be divided into several regions, e.g., $470_1$-$470_4$, to simultaneously display a plurality of materials. The divided four regions are merely an example and it is certainly not limited to what is shown in FIG. 20. The node 410, whose keyword is used for keyword search, may be also displayed in the display unit 106 such that a user can easily understand the displayed materials and the keyword related to them.

The files related to the keyword of the node and displayable in the display region $470_1$-$470_4$ may include a summary information for the node, a hyperlink referring to a material, a text document such as a word file, a presentation material such as a power point file and an image material such as a jpg file or a video material such as an avi file. Further, the file may include a sound material such as an mp3 file or a record material such as a wav file. It should be noted that a playing apparatus such as an audio or speaker may be needed to play the video material, the sound material, the record material, etc. The above materials are only an example, and the file related to the keyword of the node may include any text or multimedia material parsable and displayable.

Figure 21:
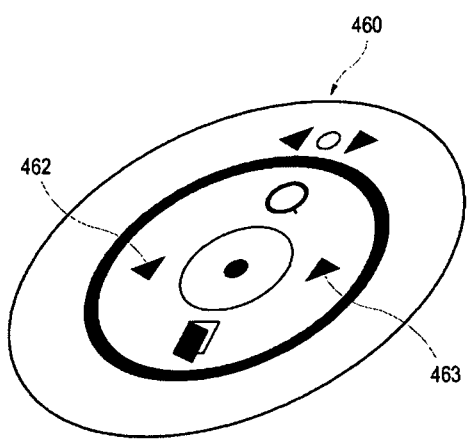
FIG. 21 through FIG. 23 are diagrams illustrating displays in a display unit on executing a keyword search in accordance with exemplary embodiments.

FIG. 21 illustrates an exemplary search button 460 for facilitating the display of the searched materials on executing the keyword search. For example, the scroll symbol 462 or 463 of the search button 460, when touched by a user's finger (pointing event), may enable the searched materials to be displayed in an orderly fashion.

Figure 22:
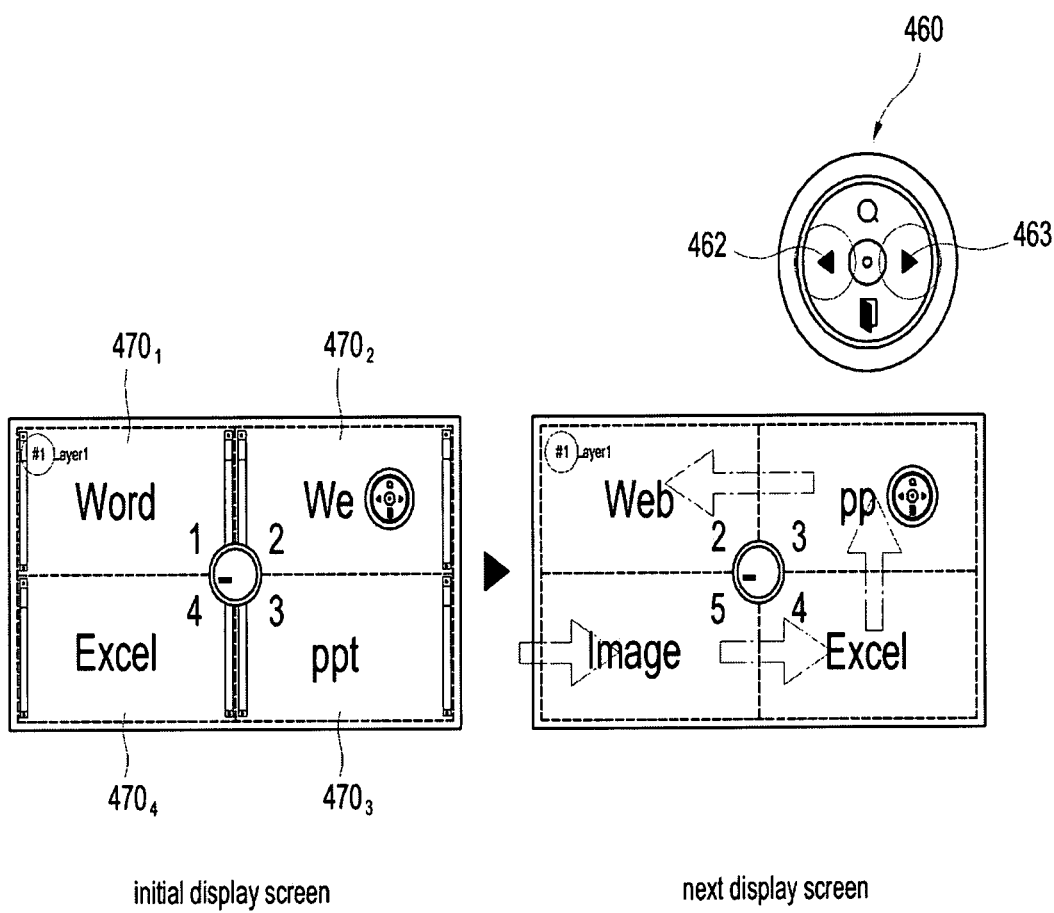

FIG. 22 illustrates an exemplary use of the scroll symbol 462 or 463 of the search button 460. The files searched by the keyword search may be displayed initially as shown at the left side of FIG. 22. A word file 1, a web page 2, a power point file 3 and an excel file 4 are displayed in the region $470_1$, $470_2$, $470_3$, $470_4$, respectively. The reference number of a file may indicate a listed order. When the scroll symbol 463 is touched, the display of the materials may be changed as shown at the right side of FIG. 22. In other words, a web page 2, a power point file 3, an excel file 4 and an image file 5 are displayed in the region $470_1$, $470_2$, $470_3$, $470_4$, respectively. In such a case, when the scroll symbol 462 is touched, the display of the materials may be returned as shown at the left side of FIG. 22. The above display scheme and the scroll symbol 462 or 463 are only an example and not be limited thereto.

Figure 23:
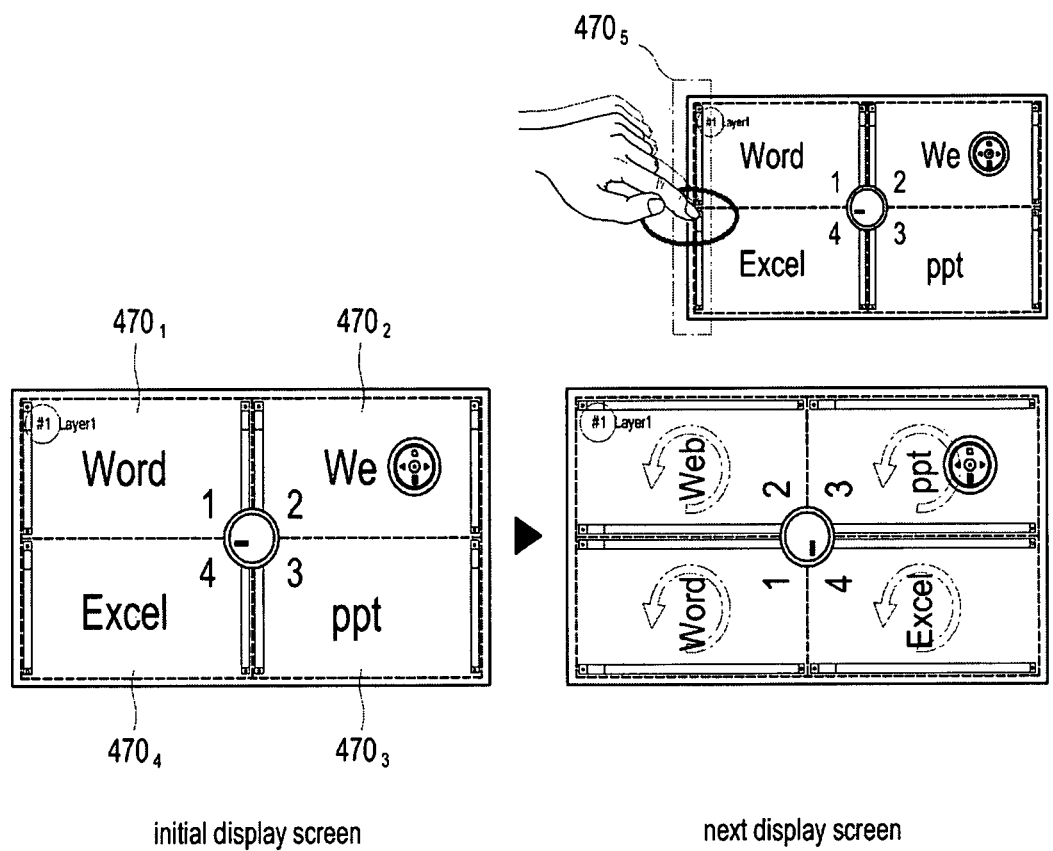

FIG. 23 illustrates an exemplary direction change of the displayed materials searched by the keyword search. When a direction change area $470_5$ is touched on executing the keyword search, the direction of the displayed materials may be changed. The initial display screen as shown at the left side of FIG. 23, when the direction change area $470_5$ is touched, may be changed to the display screen as shown at the right side of FIG. 23, wherein the upside of the displayed text is in the direction of the direction change area $470_5$. For example, if the direction change area $470_5$ is located at each of the four edges of the display unit 106, then the direction of the displayed materials may be changed to the direction of the four edges in a similar way as described above. Such a direction change may provide the users surrounding a meeting table with great legibleness (e.g., the users in any direction may easily read the text information).

If the controller 104 interprets the operation of the electric signal as "zoom in/out," then the controller 104 may transmit to the display unit 106 a control signal instructing to display the layer in an adjusted size. The operation (one of the operations provided by the control button bundle 440 as described above) may be executed, e.g., if the zoom in/out symbol 441/442 is touched by the user's finger (pointing event) when the control button bundle 440 is ON. All the nodes in the layer are scaled up/down in proportion to the scale of the layer as the layer is scaled up/down. If "zoom in/out" is selected to 0% or 100%, then it may correspond to "minimize layer" or "maximize layer," which is explained below.

If the controller 104 interprets the operation of the electric signal as "save in file," then the controller 104 may save the graphic objects displayed in the display unit 106 in a file storable in a computer readable medium. The operation (one of the operations provided by the control button bundle 440 as described above) may be executed, e.g., if the "save in file" symbol 445 is touched by the user's finger (pointing event) when the control button bundle 440 is ON.

According to an aspect, the file having stored the graphic objects therein may include an XML file. In this case, the controller 104 may first generate elements for each layer. If the controller 104 manages the graphic objects in the two types of data structure, a list and a graph, as described above, and the elements for the layer may be generated with reference to the layer list. Then, the elements for the node and the link may be generated. Similarly, the elements for the node and the link may be generated with reference to the node list and the link list if the graphic objects are managed in the list. Further, the auxiliary information of the list may be added in the file as an attribute. If all elements are generated, then each of the node element and the link element may be registered at the layer element to thereby generate a file.

If the controller 104 interprets the operation of the electric signal as "open file," then the controller 104 may call and parse a file having stored the graphic objects therein and transmit to the display unit 106 a control signal instructing to display the parsed file. The operation (one of the operations provided by the control button bundle 440 as described above) may be executed, e.g., if the "open file" symbol 446 is touched by the user's finger (pointing event) when the control button bundle 440 is ON.

In the embodiment, when "open file" is executed, the file called by the controller 104 may include an XML file having stored the graphic objects therein. In this case, the controller 104 may first check a root element to determine whether the file is usable for the apparatus and then extract child elements. The child elements may include layer elements, each of which may include node elements and link elements as a child element. Such a representation scheme describing the information for a single graph would be helpful in connecting a layer to a graph, i.e., to connect information of the control region to information of the display region systematically. The link element may include a link ID, description and IDs of two nodes connected by the link as an attribute. The node element may include a node ID, description, coordinates and size. If the controller 104 manages the graphic objects in the two types of data structure (a list and a graph as described above), then the parsed information may be saved in the list and the graph for the graphic object. Then, the operation "generate" for the graphic object may be executed to display the graphic object in the display unit 106.

If the controller 104 interprets the operation of the electric signal as "maximize/minimize," then the controller 104 may save the information for the activated layer on the current display unit 106 in a temporal storage and hide the layer (minimize). Also, it may call the saved information for the minimized layer from the temporal storage and activate the layer (maximize). Referring to FIG. 4, the layer $430_1$ may have been activated and the layers $430_2$-$430_L$ may have been minimized. If the layer $430_1$ is minimized, then it may be hid. If one of the layers $430_2$-$430_L$ is maximized, then the maximized layer may be activated.

The display unit 106 may display the graphic object pursuant to the instructions of the controller 104. The display unit 106 may be implemented in the liquid crystal display (LCD), but is certainly not limited thereto.

Figure 24:
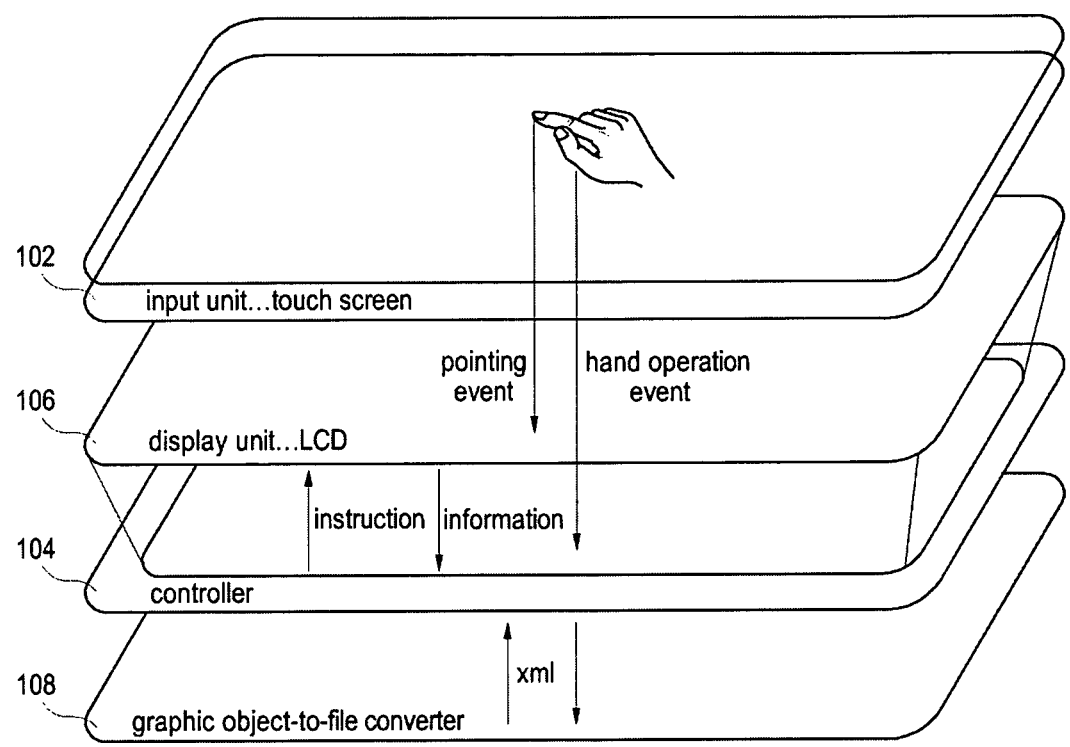
FIG. 24 is a diagram illustrating a configuration having an input unit on a display unit in accordance with an exemplary embodiment.

FIG. 24 illustrates a configuration having an input unit 102 on a display unit 106 in accordance with an exemplary embodiment. In this embodiment, the input unit 102 may include a touch screen and the display unit 106 may include an LCD. If a manual operation such as a circle, a z shape, etc. occurs, then the input unit 102 may transmit an electric signal corresponding to the manual operation to a controller 104. The controller 104 may interpret the received electric signal and perform an appropriate operation according to the interpretation. If the controller 104 interprets the electric signal as an operation related to the display, then it may transmit to the display unit 106 a control signal instructing this. If a pointing event such as touching a graphic object with a user's finger occurs, then the controller 104 may communicate with the display unit 106 to obtain the information on the pointed graphic object. As such, the users can operate an input/output apparatus with an intuitive gesture based on the display.

According to an aspect, if a large-sized touch screen and an LCD (e.g., 55 inch-sized touch screen and 55 inch-sized LCD) are used for the input unit 102 and the display unit 106, respectively, then it may be possible for many users to conveniently and simultaneously input to the apparatus via the large-sized touch screen. When many users want to input information to a conventional input/output apparatus, the users are generally required to use the apparatus in order or after a plurality of users input devices, such as a notebook, a keyboard, a mouse, or etc. are physically connected to the apparatus, wherein a switching apparatus operates to connect the apparatus to a user's input device logically. According to an exemplary embodiment disclosed herein, many users may use an input/output apparatus conveniently and freely without worrying about the order of use, a separate input device for each user, or a switching apparatus as described above with respect to the conventional input/output apparatus. Accordingly, the exemplary embodiment may increase the work productivity, such as, in a meeting, and allow many users to input information and obtain output.

As shown in FIG. 24, a manual operation based input/output apparatus may further include a graphic object-to-file converter 108. The graphic object-to-file converter 108 may convert a file for a graphic object to a file in another form such that the converted file is compatible with the conventional system and a variety of application programs. The converted file may include an image file, a word file, a power point file, etc., but is certainly not limited thereto.

Figure 25:
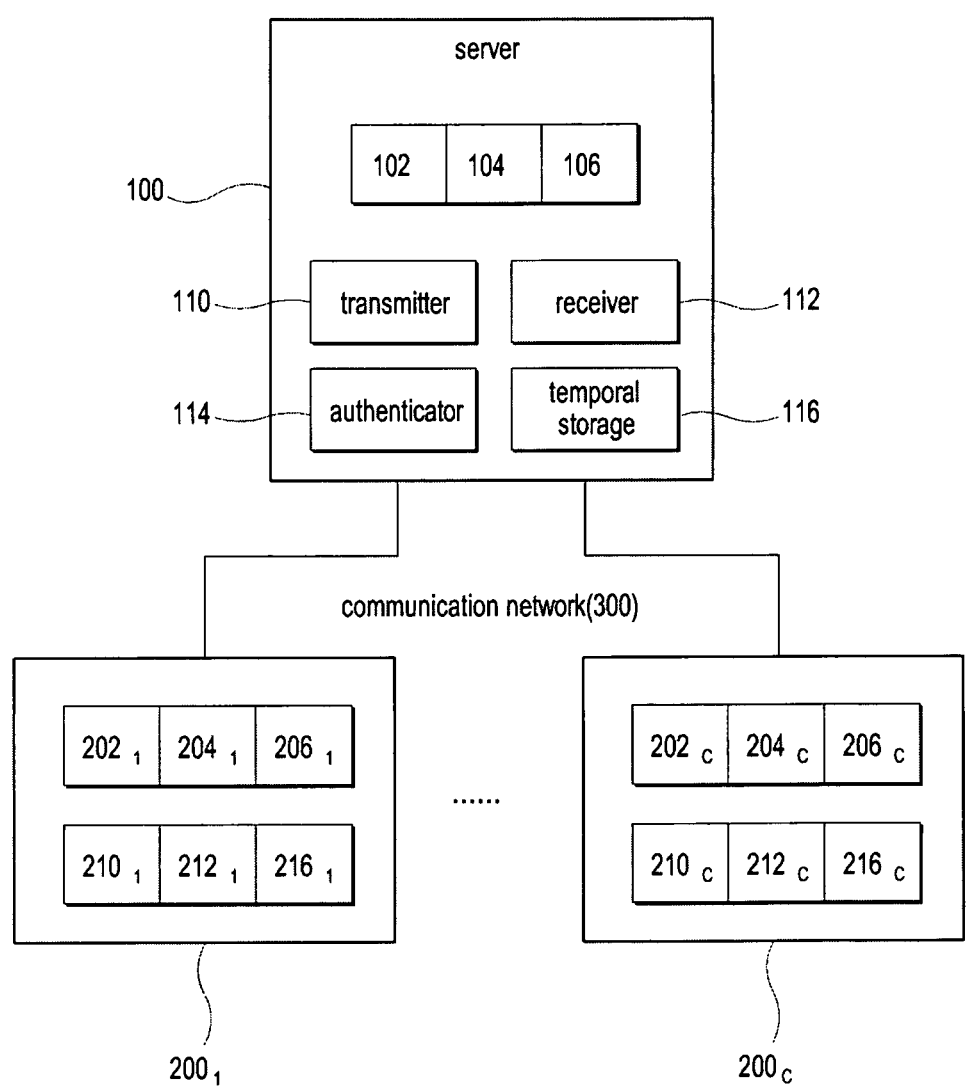
FIG. 25 is a diagram illustrating a configuration of a server-client system using a manual operation based input/output apparatus in accordance with an exemplary embodiment.

FIG. 25 illustrates a configuration of a server 100 and clients $200_1$-$200_C$ that are connected operatively via a communication network 300 in accordance with an exemplary embodiment. As shown in FIG. 25, the client $200_1$-$200_C$, for example, a user's personal input/output apparatus, may be implemented in a notebook or a tablet PC that is conveniently portable. However, it is certainly not limited to the above. The communication network 300 may include a wired network such as LAN, a wireless network such as Bluetooth or any network supporting bi-directional data communication between the connected apparatuses.

As shown in FIG. 25, a manual operation based input/output apparatus used for the server 100 and the client $200_1$-$200_C$ may further include a receiver 112, $212_1$-$212_C$ to receive information on a graphic object via the communication network 300, as well as a temporal storage 116, $216_1$-$216_C$ to temporally store the graphic objects displayed in a display unit 106, $206_1$-$206_C$. If the receiver 112, $212_1$-$212_C$ receives the information on the graphic object via the communication network 300, then the temporal storage 116, $216_1$-$216_C$ may have temporally stored the graphic objects displayed in the display unit 106, $206_1$-$206_C$ therein and the display unit 106, $206_1$-$206_C$ may display the received graphic object.

The server 100 may further include a transmitter 110 to transmit the information on the graphic object via the communication network 300. It may also include an authenticator 114 to authenticate the client $200_1$-$200_C$ and to approve its connection when the client $200_1$-$200_C$ requests to connect to the server 100 via the communication network 300. According to an aspect, the authenticator 114 may register the auxiliary information of the authenticated client $200_1$-$200_C$, e.g., ID and IP address, at a hash table to manage the connected client $200_1$-$200_C$.

Figure 26:
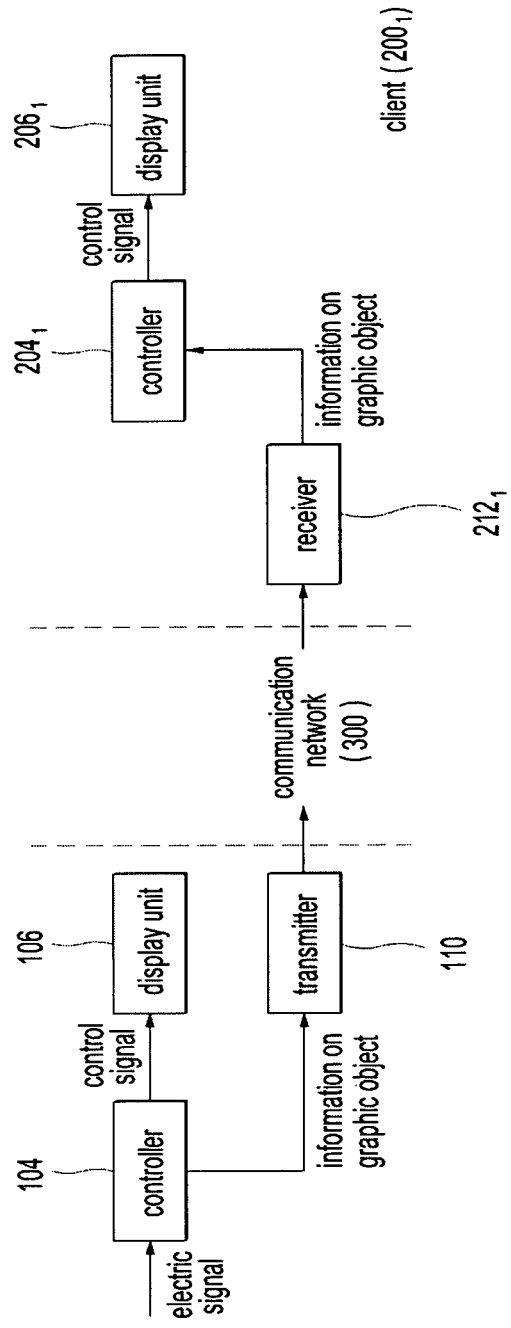
FIG. 26 and FIG. 27 are diagrams illustrating transmission/reception of information on a graphic object in a server-client system in accordance with exemplary embodiments.
Figure 27:
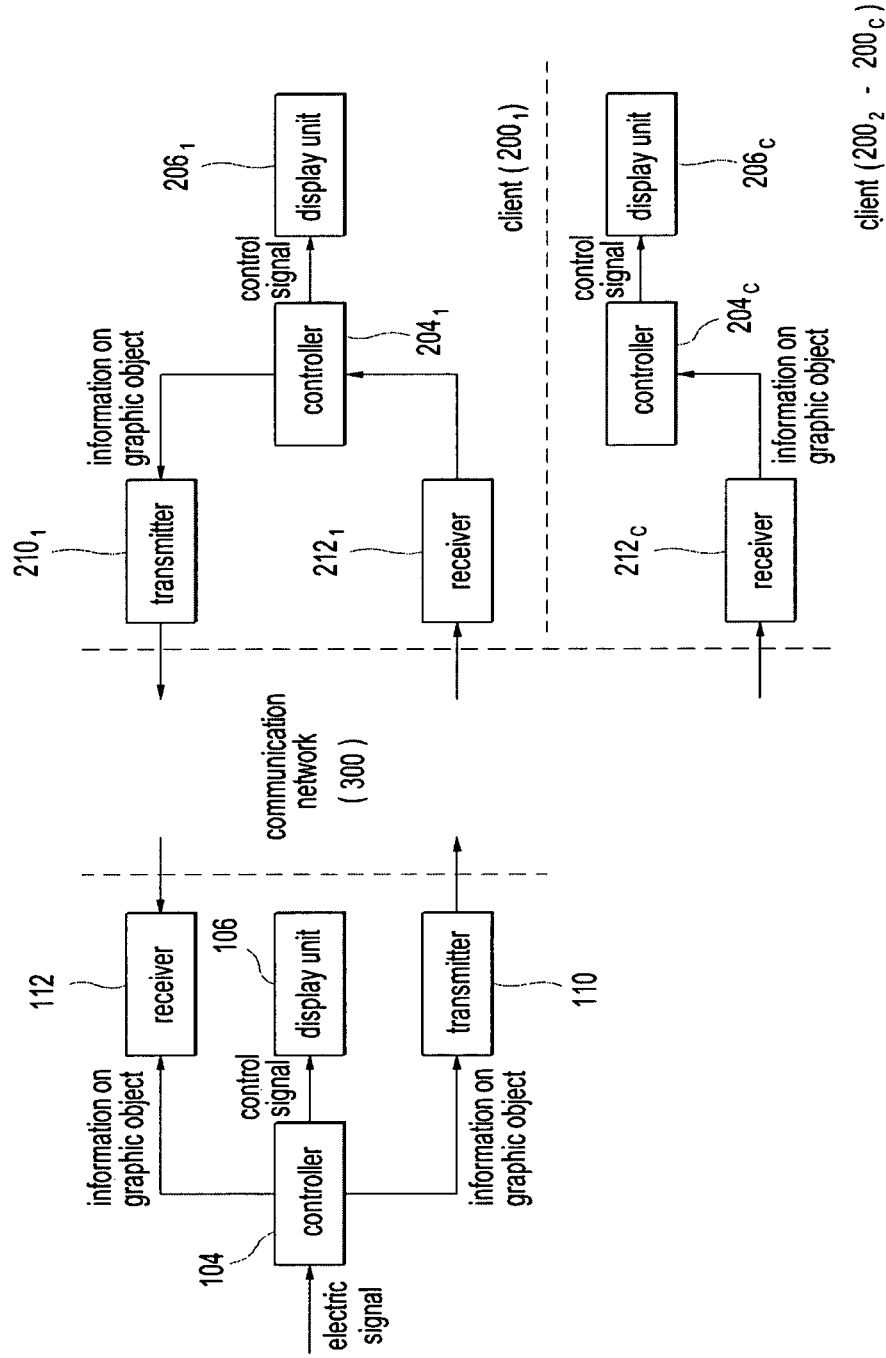

FIG. 26 and FIG. 27 illustrate examples when a server and clients transmit/receive information on a graphic object in a server-client system. As shown in FIG. 26, the transmitter 110 of the server 100, when a client $200_1$ is connected to the server 100, may transmit the information on the graphic object displayed in the display unit 106 of the server 100 to the connected client $200_1$ via the communication network 300. According to an aspect, the information on the graphic object transmitted by the transmitter 110 may include the data structure on the graphic object managed by the controller 104. The information on the graphic object may be transmitted by the transmitter 110 using the operation "save in file," as described above.

The client $200_1$, when it receives the information on the graphic object from the server 100, may store the information on the graphic object displayed in its display unit $206_1$ in its temporal storage $214_1$ and may display the received graphic object in its display unit $206_1$. Such a process may be performed from the receiver $212_1$ by using the operation "open file," as described above. The controller $204_1$ may hide the activated layer by performing the operation "minimize" and activate the layer including the received graphic object by performing the operation "maximize." If the controller $204_1$ manages the graphic objects with the data structure as described above, then it may parse the information on the graphic object, generate a new data structure for the graphic object and register each graphic object at the generated data structure in a similar way to the operation "open file."

In the server-client system, the information on the graphic object may be transmitted/received via an XML based socket data communication. In such a system, a remote user can update and display the work proceeding on the server, e.g., meeting material, on his/her apparatus (client) in real time.

FIG. 27 illustrates an example when a client transmits the information on the graphic object to a server in a server-client system. The client $200_1$ may further include a transmitter $210_1$ to transmit the information on the graphic object via the communication network 300. The client $200_1$ may transmit the information on the graphic object to the server 100 in a similar way as described above with reference to FIG. 26. The receiver 112 of the server 100, when it receives the information on the graphic object from the client $200_1$, may process the received information on the graphic object in a similar way as described above with reference to FIG. 26.

As described above with reference to FIG. 26, the transmitter 110 of the server 100, when a client $200_1$-$200_C$ is connected to the server 100, may transmit the information on the graphic object displayed in the display unit 106 of the server 100 to the connected client $200_1$-$200_C$ via the communication network 300. Thus, as shown in FIG. 27, if the client $200_1$ transmits the information on the graphic object to the server 100, then the server 100 may once again transmit the received information on the graphic object to the connected client $200_1$-$200_C$. Thus, according to the server-client system, every client connected to the server may share and display the information on the graphic object of one client.

In another example, an authorized client may transmit the information on the graphic object to the other connected clients, as well as directly to the server.

According to an aspect, it may be only one apparatus with an authority to operate the graphic object that transmits the information on the graphic object. The authority to operate the graphic object may be an authority to transmit the information on the graphic object displayed in the display unit 106 of a server 100 when numerous clients $200_1$-$200_C$ are connected to the server 100 operatively via the communication network 300, which is for preventing data conflict due to the operations of several apparatuses. In default, the server 100 may have the authority and the clients $200_1$-$200_C$ may request the authority to the server 100 as necessary.

Referring back to FIG. 27, the client $200_1$ may be authorized to operate the graphic object from the server 100. In this case, it may be only the client $200_1$ that transmits the information on the graphic object to the server 100, while the other clients $200_2$-$200_C$ may not transmit the information on the graphic object to the server 100. However, each client $200_1$-$200_C$ may freely operate the graphic object displayed in its own display unit $206_1$-$206_C$ via its input unit $202_1$-$202_C$ regardless of the authority.

According to an aspect, the manual operation input to the input unit 102 may be displayed in the display unit 106 even if the client 200 is authorized from the server 100. This may correspond to the free operations of the client $200_1$-$200_C$, e.g., generate or delete, regarding its own graphic object displayed in its own display unit regardless of the authority as described above. In another example, the input unit 102 may be disabled and the manual operation input to the input unit 102 may not be displayed in the display unit 106 when the client $200_1$ is authorized from the server 100. In other words, the server may be treated differently from the client since the client is used for a remote user as a personal device, while the server is common for a plurality of users at close range. The treatment of the server may be selected depending on applications.

Figure 28:
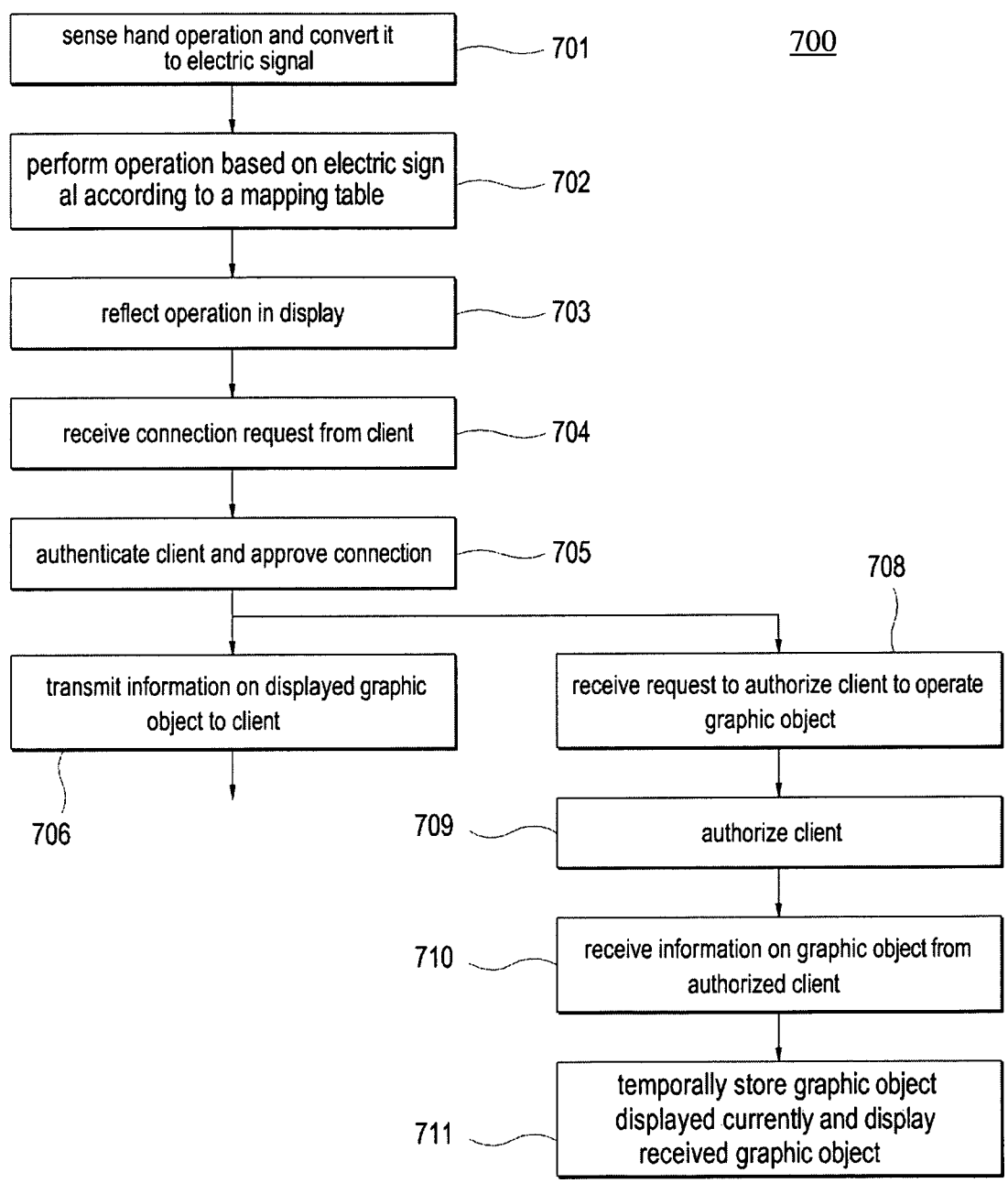
FIG. 28 is a logical flow chart illustrating a manual operation based input/output method in accordance with an exemplary embodiment.

FIG. 28 illustrates a logical flow chart for performing a manual operation based input/output method 700 in accordance with an exemplary embodiment. First, a hand operation may be sensed and the sensed result may be converted into an electric signal in operation 701. The electric signal may include a protocol with a message as shown in FIG. 12.

In operation 702, an operation may be performed based on the electric signal according to a mapping table. The mapping table may include a mapping table as shown in FIG. 13.

In operation 703, the operation may be reflected in a display.

The manual operation based input/output method 700 may further include an operation for receiving a connection request via a communication network from a client, in operation 704. Then, a server may authenticate the requesting client and approve its connection in operation 705. Next, the server may transmit information on a displayed graphic object to the connected client in operation 706.

The manual operation based input/output method 700 may further include an operation for receiving a request to authorize one of the connected clients to operate the graphic object, in operation 708. Then, in response to the request, the server may authorize the requesting client to operate the graphic object in operation 709. Next, the server may receive the information on the graphic object from the authorized client in operation 710. The server may temporally store the graphic object displayed currently in its display unit and display the received graphic object on the display unit in operation 711.

Figure 29:
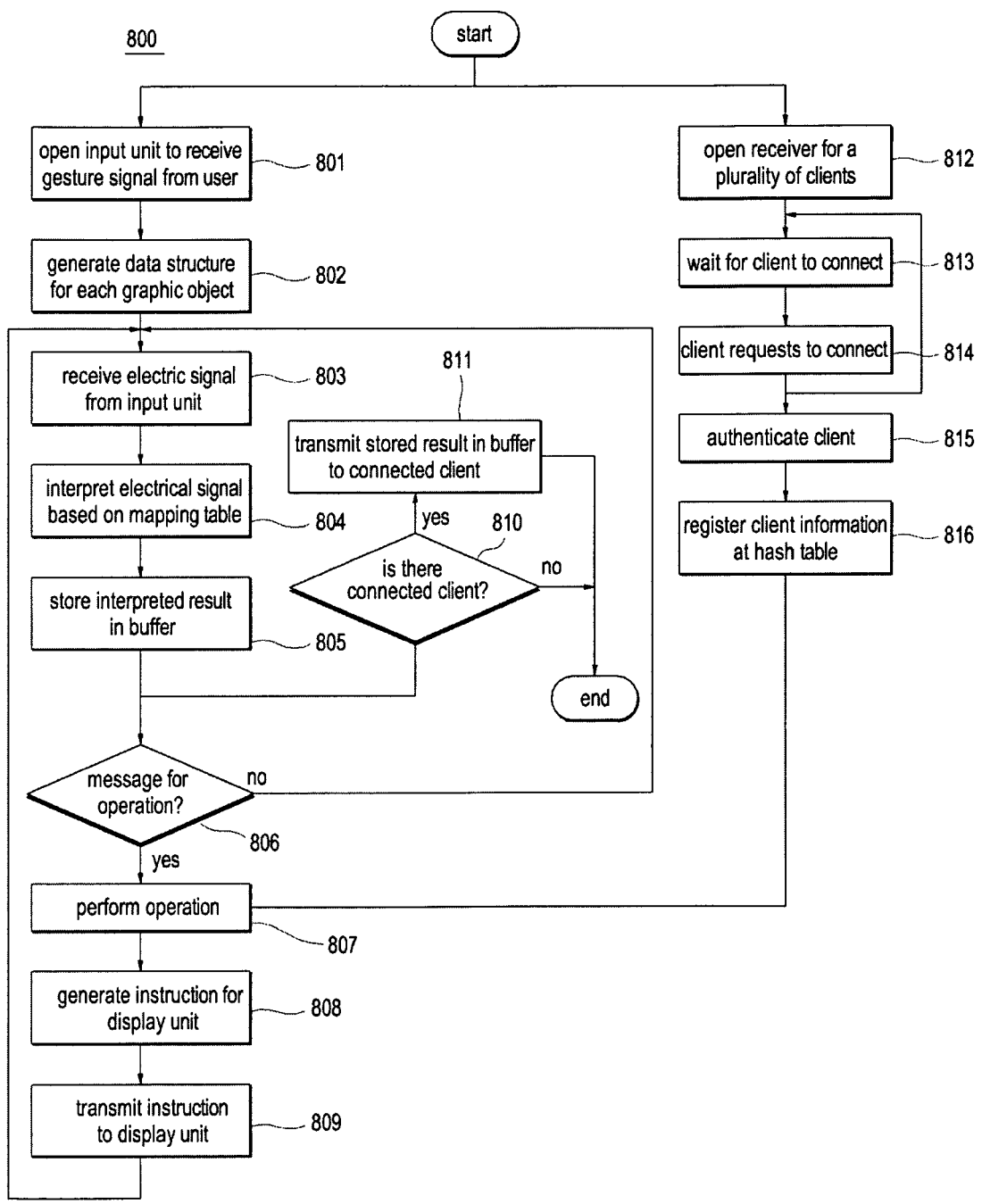
FIG. 29 is a logical flow chart illustrating a manual operation based input/output method in accordance with another exemplary embodiment.

FIG. 29 illustrates a logical flow chart for performing a manual operation based input/output method 800 in accordance with another exemplary embodiment. The input unit 102 may be opened to receive a user's gesture signal in operation 801. Then, the controller 104 may provide a data structure for each graphic object in operation 802. The graphic object may include a node, a link, and a layer as described above. Next, in operation 803, the controller 104 may receive an electric signal from the input unit 102. Then, the controller 104 may interpret the electric signal based on a mapping table in operation 804. The mapping table may include e.g., the mapping table as shown in FIG. 13. The controller 104 may store the interpreted result in a buffer in operation 805. The controller 104 may determine whether the interpreted result is a message related to an operation to be performed in operation 806. The controller 104 may perform the corresponding operation if the interpreted result is a message in operation 807.

The controller 104 may generate a control signal instructing to display in the display unit 106 according to the performed operation in operation 808. In operation 809, the controller 104 may transmit the generated control signal to the display unit 106.

The manual operation based input/output method 800 may further include an operation 810 for determining whether the connected client exists after the operation 805. In this case, if the connected client exists, then the stored result in the buffer may be transmitted to the connected client in operation 811.

The manual operation based input/output method 800 may further include an operation 812 for opening a receiver 112 for a plurality of clients. In this case, in operation 813, the receiver 112 may wait for a client to connect after it is opened. If a client requests to connect in operation 814, then the authenticator 114 may authenticate the requesting client and approve the connection in operation 815. The information on the authenticated client may be registered at a hash table in operation 816. The controller 104 may process a file if the client transmits the file in operation 807. The process may include, e.g., storing the displayed graphic object temporally and displaying the received graphic object, as described above.

Figure 30:
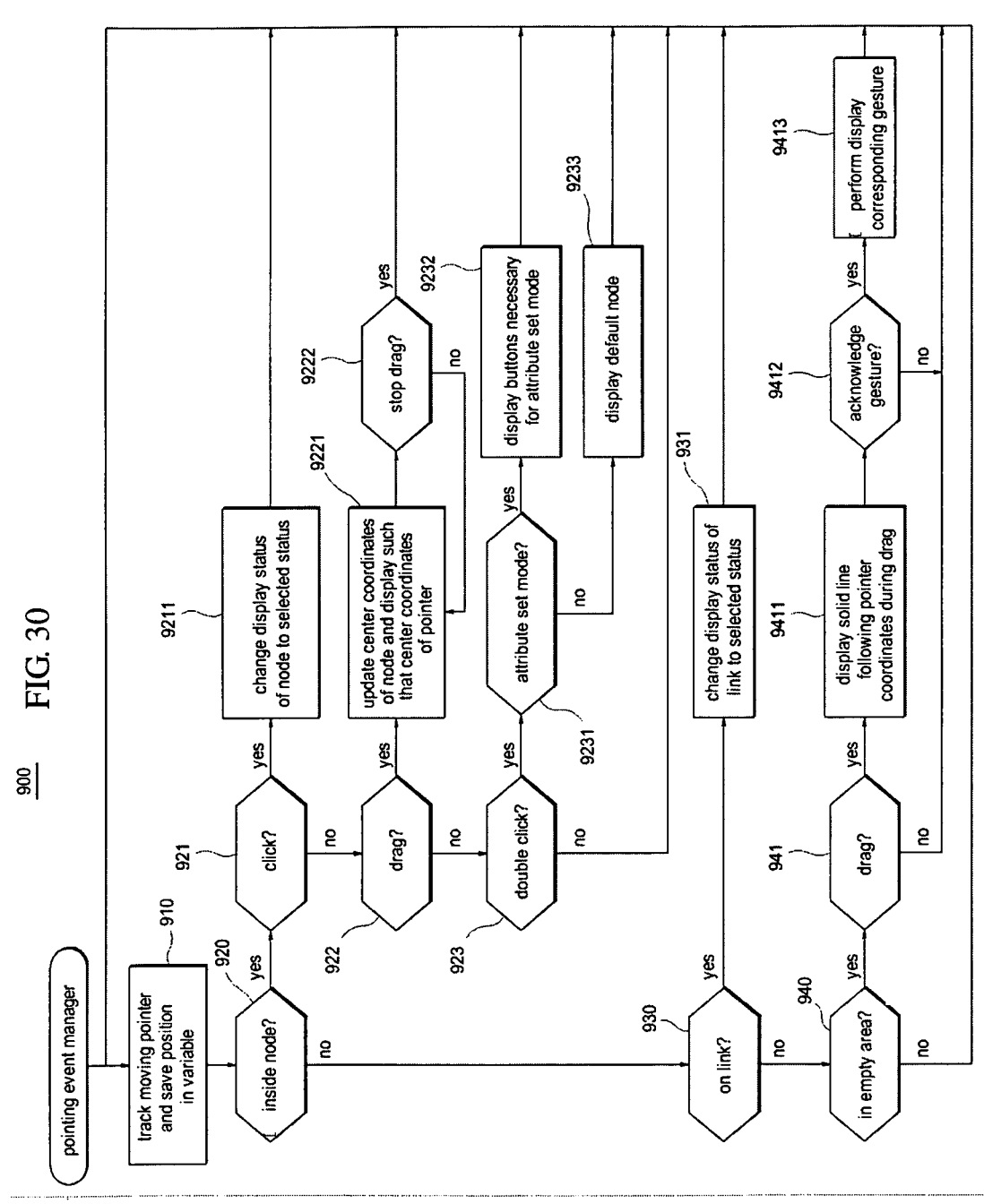
FIG. 30 is a logical flow chart illustrating a graphic user interface method sensing and displaying a manual operation based input in accordance with an exemplary embodiment.

FIG. 30 illustrates a logical flow chart of an exemplary graphic user interface method 900 for sensing and displaying a manual operation based input. A pointing event (user's input) manager may sense a user's input, track moving pointer and save the position of the pointer in a variable in operation 910. It may be determined that the pointing event occurs inside a node area in operation 920, on a link in operation 930 or in an empty area having no graphic objects (background area) in operation 940.

If the user's input is inside a node, then it may be determined if the input is a click in operation 921, a drag in operation 922 or a double click in operation 923. If the input is a click, then the display status of the corresponding node may be changed to a selected status in operation 9211. The display status may be changed, e.g., by changing the color of the color area 415 of the node (see FIG. 2) or providing a radiated animation effect (twinkling effect) on the node. If the input is a drag, then the display of the corresponding node may be updated such that the center coordinates of the node becomes the coordinates of the pointer in operation 9221. The update may be continued until the drag stops. If the input is a double click, then it may be determined whether the corresponding node is in the attribute set mode in operation 9231. If the node is in the attribute set mode, then the buttons such as "enlarge/reduce" 416, "adjust scale 417, "keyword search" 418, etc. necessary for the attribute set mode may be displayed in operation 9232 (see FIG. 17). If the node is not in the attribute set mode, then the default node may be displayed in operation 9233 (see FIG. 2).

If the user's input is on a link, then the display status of the corresponding link may be changed to a selected status in operation 931. The display status may be changed in a similar way as described above.

If the user's input is in an empty area, then it may be determined whether the input is a drag in operation 941. If a drag is acknowledged as a gesture, e.g., "generate node" in operation 9412, then the display corresponding to the gesture, e.g., displaying a new node, may be performed in operation 9413. For the user's convenience, a solid line following a drag may be displayed selectively after an input is determined as the drag until the drag is acknowledged as a gesture in operation 9411.

The users using a graphic user interface in accordance with certain embodiments disclosed herein, may intuitively understand the materials related to the current items and their relations without resorting to complicated exploring procedures.

A graphic user interface in accordance with certain embodiments disclosed herein may enable a user to search and display various types of materials related to the items. Further, the direction of the display may be changed such that the attendees in any direction may grasp the contents of the meeting.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above. Further, one or more computer-readable media may be located in separate systems connected via the network and have saved codes executed in a decentralized method thereon.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An input/output computing apparatus for intuitive interfacing with a user, the apparatus comprising:
   an input unit configured to detect predetermined motions of the user and to generate a signal corresponding to the detected predetermined motions, the signal comprising an operation field and an object field representing a target on which the operation is to be performed;
   a controller configured to carry out an operation corresponding to the signal and to generate a control signal selected from a mapping table comprising an operation field and an object field for control signals against which the operation field and the object field of the signal corresponding to the detected predetermined motions are compared and matched, wherein each of the signal corresponding to the detected predetermined motions and the control signal correspond to each other in order to obtain a display result defined by the operation; and
   a display unit configured to display the result defined by the operation, wherein:
   the display unit is further configured to display nodes corresponding to and providing information on materials stored in a database accessible by the apparatus, a link between the nodes, and a keyword within a displayed node that describes the information on the materials stored in the database;
   the display unit is further configured to display within the node an identifier representing the position of the node within the display;
   the detected predetermined motions comprise a motion to generate a graphic object; and
   the controller is further configured to save the graphic object in a corresponding list, in response to a determination of the graphic object not being saved,
     wherein saving the graphic object comprises saving center coordinates and size of the graphic object in response to the graphic object being the node, and saving IDs of a start node and an end node of the graphic object in response to the graphic object being the link.

2. The apparatus of claim 1, wherein the materials are related as one of a parent/child relationship, a prior/posterior relationship, and a belonging relationship.

3. The apparatus of claim 1, wherein the input unit comprises a touch screen configured to sense predetermined motions of users and to allow the users to simultaneously input with respect to the apparatus.

4. The apparatus of claim 1, wherein the detected predetermined notions further comprise a motion to generate a link between graphic objects, a motion to generate a control button, a motion to generate a virtual keyboard, a motion to delete an object, and a motion to generate a layer or a second layer to arrange one or more graphic objects corresponding to a material or related materials stored in the database.

5. The apparatus of claim 4, further comprising a memory, accessible by the controller, the memory being configured to store the mapping table to interpret the signal corresponding to the detected predetermined motions into a corresponding operation, and to store a data structure for graphic objects managed by the controller.

6. The apparatus of claim 4, wherein the graphic object is acted on according to one of inputting information with respect to the corresponding material, searching the database for related materials to display the related materials, changing location or direction of the graphic object, enlarging or reducing the graphic object, and opening the corresponding material.

7. The apparatus of claim 4, further comprising a transmitter or receiver unit configured to communicate information on the graphic object to at least one computing client apparatus.

8. The apparatus of claim 7, wherein the information on the graphic object is transmitted and received via an XML based socket data communication.

9. The apparatus of claim 1, wherein the predetermined motions comprise user object drawing motions.

10. An input/output computing apparatus for intuitive interfacing with a user, the apparatus comprising:
    an input unit;
    a display unit configured to display graphic objects corresponding to and providing information on materials stored in a database accessible by the apparatus, on a link between the graphic objects representing a relationship between the graphic objects, and on a keyword within a displayed graphic object that describes the information on the materials stored in the database; and
    a controller, wherein:
    the display unit is further configured to display within the graphic object an identifier representing the position of the graphic object within the display;
    the input unit is further configured to input one of predetermined motions of the user and to generates a signal corresponding to the detected predetermined motions, the signal comprising an operation field and an object field representing a target on which the operation is to be performed;
    the controller is configured to carry out an operation corresponding to the signal and to generates a control signal selected from a mapping table comprising an operation field and an object field for control signals against which the operation field and the object field of the signal corresponding to the detected predetermined motions are compared and matched;
    each of the signal corresponding to the detected predetermined motions and the control signal correspond to each other in order to obtain a display result defined by the operation;
    the detected predetermined motions comprise a motion to generate a graphic object; and
    the controller is further configured to save the graphic object in a corresponding list, in response to a determination of the graphic object not being saved, wherein saving the graphic object comprises saving center coordinates and size of the graphic object in response to the graphic object being the node, and saving IDs of a start node and an end node of the graphic object in response to the graphic object being the link.

11. The apparatus of claim 10, wherein the graphic objects and the link are displayed to allow the user to intuitively visualize the relationship between the corresponding materials or status of the corresponding materials.

12. The apparatus of claim 10, wherein a graphic object is acted on according to one of inputting information with respect to a corresponding material, searching the database for related materials to display the related materials, changing location or direction of the graphic object, enlarging or reducing the graphic object, and opening the corresponding material.

13. The apparatus of claim 12, wherein the input unit is one of a touch screen, an infrared ray transceiver, and a camera for sensing a visual input, and wherein the input unit allows the user to interface with the graphic object acted on.

14. The apparatus of claim 10, wherein the detected predetermined motions further comprise a motion to generate a control button, a motion to generate a virtual keyboard, a motion to delete an object, and a motion to generate a layer or a second layer to arrange one or more graphic objects corresponding to a material or related materials stored in the database.

15. The apparatus of claim 10, wherein the input from the user is one of predetermined motions of the user.

16. The apparatus of claim 10, wherein the predetermined motions comprise user object drawing motions.

17. A method of interfacing with an input/output computing apparatus, the method comprising:
   detecting intuitive motions of a user;
   generating a signal corresponding to the detected intuitive motions;
   performing operations corresponding to the signal, wherein correspondence between the operations and the signal being is based on matching the signal to an operation within a mapping table, and wherein the operation comprises a motion to generate a graphic object;
   displaying a result of the operations, wherein the operations define the displayed result;
   displaying graphic objects, the graphic objects corresponding to and having information on materials stored in a database accessible by the apparatus, wherein a link between the graphic objects represents a relationship of the graphic objects, and wherein a keyword within a displayed graphic object that describes the information on the materials stored in the database corresponding to the displayed graphic object; and
   displaying, within each displayed graphic object, an identifier representing the position of the graphic object within the display, wherein:
   the graphic objects and the link are displayed to allow a user to intuitively visualize the relationship of the corresponding materials or status of the corresponding materials;
   the controller is further configured to save the graphic object in a corresponding list, in response to a determination of the graphic object not being saved,
   wherein saving the graphic object comprises saving center coordinates and size of the graphic object in response to the graphic object being the node, and saving IDs of a start node and an end node of the graphic object in response to the graphic object being the link.

18. The method of claim 17, wherein the operations further comprise an operation to generate a link between graphic objects, an operation to generate a control button, an operation to generate a virtual keyboard, an operation to delete an object, and an operation to generate a layer or a second layer to arrange one or more graphic objects corresponding to a material or related materials stored in the database.

19. The method of claim 18, further comprising detecting an action with respect to the graphic object according to one of receiving input information with respect to the corresponding material, searching the database for related materials to display the related materials, changing location or direction of the graphic object, enlarging or reducing the graphic object, and opening the corresponding material.

20. The method of claim 17, wherein the intuitive motions comprise user object drawing motions.

* * * * *